(12) United States Patent
Kojima

(10) Patent No.: US 8,036,512 B2
(45) Date of Patent: Oct. 11, 2011

(54) DIGITAL SIGNAL RECEIVING APPARATUS AND DIGITAL SIGNAL RECEIVING METHOD

(75) Inventor: Masato Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 596 days.

(21) Appl. No.: 12/295,729

(22) PCT Filed: Mar. 19, 2007

(86) PCT No.: PCT/JP2007/055549
§ 371 (c)(1),
(2), (4) Date: Oct. 2, 2008

(87) PCT Pub. No.: WO2007/114037
PCT Pub. Date: Oct. 11, 2007

(65) Prior Publication Data
US 2009/0047001 A1 Feb. 19, 2009

(30) Foreign Application Priority Data
Apr. 4, 2006 (JP) ................................ 2006-102969

(51) Int. Cl.
*H04N 5/932* (2006.01)
*H04N 5/935* (2006.01)
*H04N 5/931* (2006.01)
*H04N 9/70* (2006.01)
(52) U.S. Cl. ......................... 386/201; 386/207; 386/300
(58) Field of Classification Search .......... 386/201–220, 386/230, 232, 300–312
See application file for complete search history.

(56) References Cited

U.S. PATENT DOCUMENTS

| 5,153,740 A * | 10/1992 | Sato ............................. 386/225 |
| 6,587,638 B1 * | 7/2003 | Watanabe et al. ............. 386/203 |
| 2002/0054751 A1 | 5/2002 | Nakamura et al. |

(Continued)

FOREIGN PATENT DOCUMENTS

JP 2005-51547 2/2005
(Continued)

OTHER PUBLICATIONS

English language Abstract of JP 2005-333472, Dec. 2, 2005.
(Continued)

*Primary Examiner* — Thai Tran
*Assistant Examiner* — Hung Dang
(74) *Attorney, Agent, or Firm* — Greenblum & Bernstein, P.L.C.

(57) ABSTRACT

A color difference processor recognizes the value of a color difference signal U and the value of a color difference signal V for each pixel from a color difference signal U/V, and respectively assigns the value of a luminance signal Y and the recognized values of the color difference signals U and V to the pixel. A reversing processor reverses, when the value of the color difference signal U and the value of the color difference signal V that are recognized by the color difference processor should be inherently recognized, respectively, as the value of the color difference signal V and the value of the color difference signal U, the recognition of the values of the color difference signals U and V that have been assigned to each pixel by the color difference processor. A conversion processor converts the value of the luminance signal Y for each pixel and the values of the color difference signals U and V for the pixel finally recognized, respectively, into the values of primary color signals R, G, and B.

8 Claims, 19 Drawing Sheets

U.S. PATENT DOCUMENTS

| | | |
|---|---|---|
| 2002/0168029 A1 | 11/2002 | Onizuka et al. |
| 2005/0259181 A1 | 11/2005 | Watanabe |
| 2007/0276892 A1 | 11/2007 | Yomo et al. |
| 2008/0072129 A1 | 3/2008 | Yamanaka et al. |

FOREIGN PATENT DOCUMENTS

| | | |
|---|---|---|
| JP | 2005-333472 | 12/2005 |
| JP | 2006-19809 | 1/2006 |
| WO | 03/058826 A2 | 7/2003 |

OTHER PUBLICATIONS

English language Abstract of JP 2006-19809, Jan. 19, 2006.
English language Abstract of JP 2005-51547, Feb. 24, 2005.
Anonymous, "High-Definition Multimedia Interface," HDMI Specification Version 1.2, [online] Aug. 22, 2005, XP002515259, retrieved from the Internet: URL:http://www.hdmi.org/download/HDMI_Specification_1.2.pdf [retrieved on Feb. 10, 2009].
Anonymous, "Interfaces for Digital Component Video Signals in 525-Line and 625-Line Television Systems Operating at the 4:2:2 Level of Recommendation ITU-R BT.601 (Part A)," ITU Radiocommunication-Recommendation ITU-R BT.656-4, [online] XP002515260, retrieved from the Internet: URL:http://inst.eecs.berkeley.edu/{cs150/Documents/ITU656.doc [retrieved on Feb. 10, 2009].
Anonymous, "Studio Encoding Parameters of Digital Television for Standard 4:3 and Wide-Screen 16:9 Aspect Ratios," ITU Radiocommunication-Recommendation ITU-R BT.601-5, [online] XP002515261, retrieved from the Internet: URL:http://asicfpga.com/site_upgrade/asicfpga/pds/image_pds_files/BT.601-5.pdf [retrieved on Feb. 10, 2009].

* cited by examiner

FIG. 3

(a) CONTENTS OF INFORMATION STORED IN REGISTER OF HDMI RECEIVER

| HORIZONTAL PIXEL NUMBER hr (HORIZONTAL SCANNING PERIOD) |
| --- |
| VERTICAL SCANNING LINE NUMBER vr (VERTICAL SCANNING PERIOD) |
| EFFECTIVE HORIZONTAL PIXEL NUMBER dep (EFFECTIVE HORIZONTAL SCANNING PERIOD) |
| SECOND BLANKING PERIOD bb (SECOND BLANKING PIXEL NUMBER) |

(b) CONTENTS OF INFORMATION STORED IN REGISTER OF DIGITAL VIDEO PROCESSING CIRCUIT

| FIRST BLANKING PIXEL NUMBER hde (FIRST BLANKING PERIOD) |
| --- |

FIG. 4

VIDEO FORMAT TABLE

| VIDEO FORMAT | HORIZONTAL PIXEL NUMBER hr | VERTICAL SCANNING LINE NUMBER vr |
|---|---|---|
| VGA | 800±10 | 525±10 |
| 525P (60Hz) | 858±10 | 525±10 |
| 750P (60Hz) | 1650±10 | 750±10 |
| 1125I (60Hz) | 2200±10 | 562±10 |
| 525I (60Hz) | 1716±10 | 262±10 |
| 1125P (60Hz) | 2200±10 | 1125±10 |
| 625I (50Hz) | 1728±10 | 312±10 |
| 625P (50Hz) | 864±10 | 625±10 |
| 750P (50Hz) | 1980±10 | 750±10 |
| 1125I (50Hz) | 2640±10 | 562±10 |
| 1125P (50Hz) | 2640±10 | 1125±10 |

F I G. 5
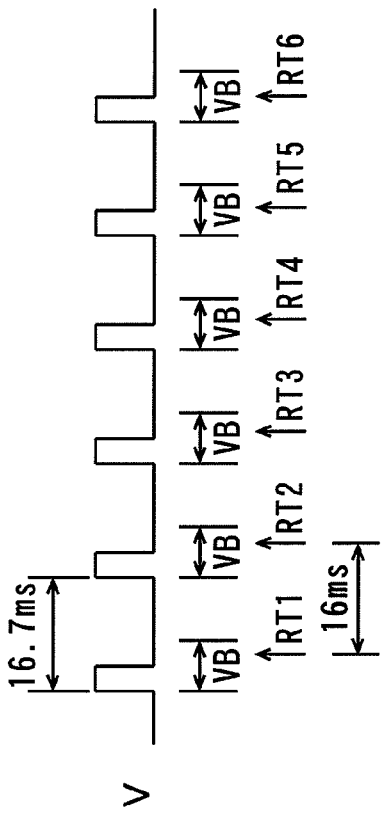
(a) CASE WHERE READING PERIOD AND FRAME PERIOD ALMOST COINCIDE
(FRAME FREQUENCY IS 60Hz)
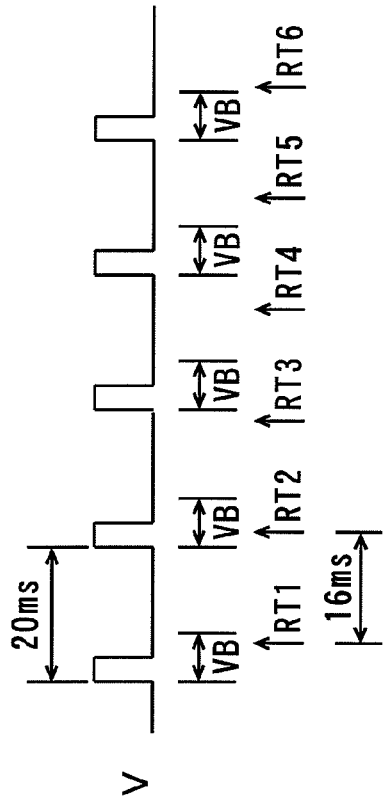
(b) CASE WHERE READING PERIOD AND FRAME PERIOD DO NOT COINCIDE
(FRAME FREQUENCY IS 50Hz)

ORIGINAL VALUES TO BE STORED IN REGISTER

| VIDEO FORMAT TABLE | HORIZONTAL PIXEL NUMBER | VERTICAL SCANNING LINE NUMBER | EFFECTIVE HORIZONTAL PIXEL NUMBER | SECOND BLANKING PIXEL NUMBER |
|---|---|---|---|---|
| 525P (60Hz) | 858 | 525 | 720 | 16 |
| 750P (60Hz) | 1650 | 750 | 1280 | 110 |
| 1125P (60Hz) | 2200 | 562 | 1920 | 88 |
| 525I (60Hz) | 1716 | 262 | 1440 | 38 |
| 1125I (60Hz) | 2200 | 1125 | 1920 | 88 |
| 625I (50Hz) | 1728 | 312 | 1440 | 24 |
| 625P (50Hz) | 864 | 625 | 720 | 12 |
| 750P (50Hz) | 1980 | 750 | 1280 | 440 |
| 1125I (50Hz) | 2640 | 562 | 1920 | 528 |
| 1125P (50Hz) | 2640 | 1125 | 1920 | 528 |

FIG. 10

VIDEO FORMAT:1080I(60Hz)

| | VALUE CONFORMING TO STANDARD | VALUE IN SPECIFIC EXAMPLE NOT CONFORMING TO STANDARD |
|---|---|---|
| HORIZONTAL PIXEL NUMBER hr | 2200 | 2200 |
| EFFECTIVE HORIZONTAL PIXEL NUMBER dep | 1920 | 1920 |
| SECOND BLANKING PIXEL NUMBER bb | 88 | 87 |
| FIRST STANDARD BLANKING PIXEL NUMBER hde0 | 192 | |
| FIRST BLANKING PIXEL NUMBER hde1 | | 193 |

F I G. 1 5
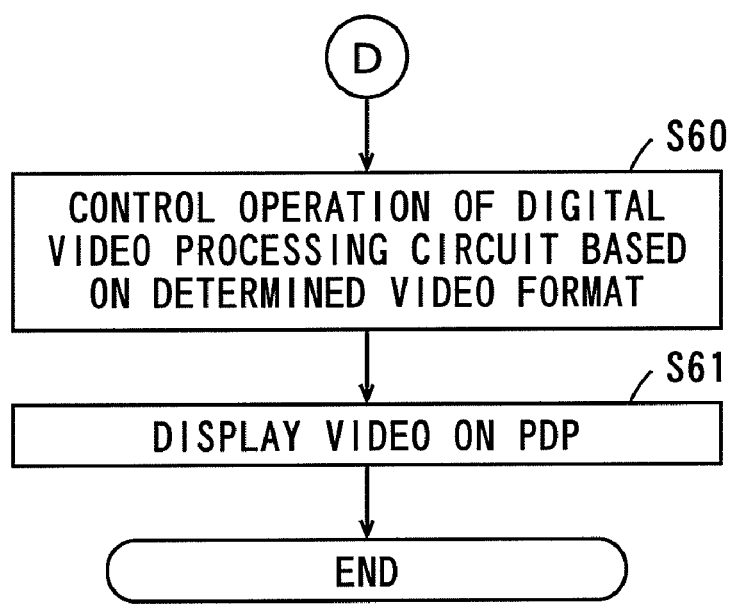

DIGITAL SIGNAL RECEIVING APPARATUS AND DIGITAL SIGNAL RECEIVING METHOD

TECHNICAL FIELD

The present invention relates to a digital signal receiving apparatus and a digital signal receiving method for receiving a digital video signal.

BACKGROUND ART

In recent years, electronic equipment conforming to digital interface standards such as the DVI (Digital Visual Interface) standard and the HDMI (High-Definition Multimedia Interface) standard has been developed in order to transmit digital video signals (see, for example, Patent Document 1).

Particularly in the HDMI standard, it is possible to multiplex digital sound signals compressed in blanking periods of digital video signals.

When interfaces conforming to the HDMI standard are used, therefore, interfaces for transmitting digital video signals and interfaces for transmitting digital sound signals need not be separately provided.

Conventional digital signal receiving apparatuses conforming to the HDMI standard will be described. FIG. 16 is a block diagram for explaining a digital signal receiving apparatus conforming to the HDMI standard.

FIG. 16 shows a plasma display device as an example of the digital signal receiving apparatus.

A digital signal receiving apparatus 90 includes an HDMI receiver 91, a digital video processing circuit 92, a PDP (Plasma Display Panel) driving circuit 93, an MCU (Microcomputer Unit) 94, and a PDP (Plasma Display Panel) 95.

The digital signal receiving apparatus 90 is provided with an HDMI terminal 90t. A DVD (Digital Versatile Disc) player 70 having an HDMI terminal 70t is connected to the HDMI terminal 90t through an HDMI cable 80.

The DVD player 70 transmits a digital video signal conforming to the HDMI standard to the HDMI receiver 91 in the digital signal receiving apparatus 90 through the HDMI terminal 70t, the HDMI cable 80, and the HDMI terminal 90t in a transmission format conforming to the TMDS (Transmission Minimized Differential Signaling) standard.

The DVD receiver 91 decodes the received digital video signal, and transmits a luminance signal Y, a color difference signal U/V, a horizontal synchronizing signal H, a vertical synchronizing signal V, a data enable signal DE, and a sampling clock signal CLK that conform to ITU (International Telecommunication Union)-R BT.601. The color difference signal U/V has two types of color difference signals U and V alternately multiplexed therein.

The luminance signal Y, the color difference signal U, and the color difference signal V have a color difference format of 4:2:2. The data enable signal DE represents an effective video period in the horizontal direction.

Furthermore, the HDMI receiver 91 detects information (the number of horizontal pixels and the number of vertical scanning lines) relating to the video format of the received digital video signal, and has information relating to the video format stored in its self-contained register.

The MCU 94 reads the information relating to the video format stored in the register of the HDMI receiver 91, and controls the digital video processing circuit 92 on the basis of the information.

The digital video processing circuit 92 recognizes the respective values of the color difference signal U and the color difference signal V for each pixel from the color difference signal U/V in accordance with the control by the MCU 94, and converts the value of the luminance signal Y, the value of the color difference signal U, and the value of the color difference signal V for each pixel, respectively, to the values of primary color signals R, G, and B. The digital video processing circuit 92 feeds to the PDP driving circuit 93 the primary color signals R, G, and B, the horizontal synchronizing signal H, the vertical synchronizing signal V, the data enable signal DE, and the sampling clock signal CLK.

The PDP driving circuit 93 displays a video on a screen of the PDP 95 on the basis of the primary color signals R, G, and B, the horizontal synchronizing signal H, the vertical synchronizing signal V, the data enable signal DE, and the sampling clock signal CLK.

FIG. 17 is a timing chart showing an example of signals transmitted from the HDMI receiver 91 to the digital video processing circuit 92 as shown in FIG. 16.

FIG. 17 shows the color difference signal U/V, the luminance signal Y, the sampling clock signal CLK, the data enable signal DE, the horizontal synchronizing signal H, and the vertical synchronizing signal V.

In this example, suppose a case where the video format of the received digital video signal is other than 525I (60 Hz) and 625I (50 Hz), for example. In this case, one period of the sampling clock signal CLK corresponds to one pixel. One period of the sampling clock signal CLK is hereinafter referred to as one clock. Although two periods of the sampling clock signal CLK correspond to one pixel when the video format is 525I (60 Hz) and 625I (50 Hz), this is not considered in this example.

The color difference signal U/V alternately includes the values of the color difference signal U and the values of the color difference signal V in the period of the sampling clock signal CLK. When the values of the color difference signal U and the values of the color difference signal V are distinguished, the value of the color difference signal U and the value of the color difference signal V are hereinafter respectively referred to as a color difference value U and a color difference value V.

For example, the color difference value U and the color difference value V of a pixel 0 are respectively "U0" and "V0", and the color difference value U and the color difference value V of a pixel 1 are respectively "U0" and "V0". The two color difference values U and V common to the two pixels are thus assigned to each of the pixels.

The luminance signal Y includes the values for each pixel in the period of the sampling clock signal CLK. The value of the luminance signal Y is hereinafter referred to as a luminance value Y.

For example, the luminance value Y of the pixel 0 is "Y0", and the luminance value Y of the pixel 1 is "Y1". Thus, one luminance value Y is assigned to one pixel. Various types of related information such as information relating to a color difference format, control information, and sound information are multiplexed in a blanking period of the color difference signal U/V and the luminance signal Y.

In FIG. 17, the related information multiplexed in the blanking period of the color difference signal U/V and the luminance signal Y is represented by "val".

A time period during which the data enable signal DE is at a high level represents an effective video period in the horizontal direction. A time period during which the data enable signal DE is at a low level corresponds to a blanking period. A video composed of a plurality of pixels is displayed on the screen on the basis of the color difference signal U/V and the luminance signal Y in the effective video period.

[Patent Document 1] JP 2006-19809 A

DISCLOSURE OF THE INVENTION

Problems to be Solved by the Invention

FIG. 18 is a timing chart for explaining processing of the digital video processing circuit 92 shown in FIG. 16. In this example, an example of the horizontal synchronizing signal H, the data enable signal DE, the color difference signal U/V, and the luminance signal Y that conform to an interlace system having 1125 horizontal scanning lines and having a frequency of 60 Hz will be described.

FIG. 18 (a) shows an example of the horizontal synchronizing signal H, the data enable signal DE, the color difference signal U/V, and the luminance signal Y that are inputted to the digital video processing circuit 92. FIG. 18 (b) shows the color difference values U and V recognized in the digital video processing circuit 92, and FIG. 18 (c) shows the color difference value U, the color difference value V, and the luminance value Y that are assigned to each pixel by the digital video processing circuit 92. FIG. 18 (d) shows the respective values of the primary color signals R, G, and B obtained on the basis of the color difference value U, the color difference value V, and the luminance value Y.

As shown in FIG. 18 (a), the color difference signal U/V and the luminance signal Y are inputted to the digital video processing circuit 92. Here, the color difference signal U/V includes values "u0", "v0", . . . "u8", "v8" in this order. Note that the color difference signal U/V includes values "val" of related information in a blanking period. Furthermore, the luminance signal Y includes values "y0", . . . "y9" in this order.

The values "u0", . . . "u8" of the color difference signal U/V inherently represent the color difference value U, and the values "v0", . . . "v8" of the color difference signal U/V inherently represent the color difference value V.

A time period T0 from the rise of the horizontal synchronizing signal H to the first pixel on one scanning line displayed on the screen is defined by a standard for each video format. The number of clocks in the time period T0 is so determined to be 192 in the interlace system having 1125 horizontal scanning lines and having a frequency of 60 Hz. In the other video format, the number of clocks in the time period T0 is also determined to be an even number. Therefore, an odd-numbered value and an even-numbered value of the color difference signal U/V with the rise of the horizontal synchronizing signal H used as a basis respectively represent the color difference value U and the color difference value V.

As shown in FIG. 18 (b), the digital video processing circuit 92 alternately recognizes the values of the color difference signal U/V with the rise of the horizontal synchronizing signal H used as a basis as the color difference value U and the color difference value V. That is, the digital video processing circuit 92 recognizes an odd-numbered value and an even-numbered value from the rise of the horizontal synchronizing signal H, respectively, as the color difference value U and the color difference value V irrespective of the data enable signal DE.

Thus, the digital video processing circuit 92 respectively recognizes the values "u0", "u2", "u4", or "u6" of the color difference signal U/V as the color difference value U, and recognizes the values "v0", "v2", "v4", and "v6" of the color difference signal U/V as the color difference value V, as shown in FIG. 18 (c). In this case, the digital video processing circuit 92 respectively assigns each of the color difference values U and each of the color difference values V to two pixels, and assigns each of the luminance values Y to one pixel.

For example, the values "u0" and "v0" of the color difference signal U/V and the value "y0" of the luminance signal Y are assigned to the pixel 0, and the values "u0" and "v0" of the color difference signal U/V and the value "y1" of the luminance signal Y are assigned to the pixel 1.

Note that the digital video processing circuit 92 does not recognize the effective video period indicated by the data enable signal DE when the color difference values U and V are recognized. Consequently, the values "val" of the related information are sequentially recognized as the color difference value U and the color difference value V.

Furthermore, as shown in FIG. 18 (d), the digital video processing circuit 92 converts the color difference value U, the color difference value V, and the luminance value Y for each pixel, respectively, into the primary color signals R, G, B. For example, the values "u0" and "v0" of the color difference signal U/V and the value "y0" of the luminance signal Y of the pixel are respectively converted into the values "R0", "G0", and "B0" of the primary color signals. Furthermore, the values "u0" and "v0" of the color difference signal U/V and the value "y1" of the luminance signal Y of the pixel 1 are respectively converted into the values "R1", "G1", and "B1" of the primary color signals.

In such a way, the primary color signals R, G, and B are obtained from the color difference signal U/V and the luminance signal Y.

The PDP driving circuit 93 displays on the PDP 95 the respective values of the primary color signals R, G, and B in the time period during which the data enable signal DE is at a high level.

As described in the foregoing, in the proper color difference signal U/V conforming to the standard of the video format, an odd-numbered value and an even-numbered value with the rise of the horizontal synchronizing signal H used as a basis respectively represent the color difference value U and the color difference value V. Therefore, the digital video processing circuit 92 can recognize whether each of the values of the color difference signal U/V with the rise of the horizontal synchronizing signal H used as a basis represents the color difference value U or the color difference value V.

When the invalid color difference signal U/V not conforming to the standard of the video format is fed to the video signal receiving apparatus 90 from external equipment, however, the digital video processing circuit 92 erroneously recognizes whether each of the values of the color difference signal U/V represents the color difference value U or the color difference value V.

FIG. 19 is a timing chart for explaining processing of the digital video processing circuit 92 in a case where an invalid signal is fed.

Note that in this example, the invalid signal means one, having an odd number of values "val" of related information existing particularly in its blanking period, of the invalid color difference signals U/V not conforming to the standard of the video format.

FIG. 19 (a) shows an example of the horizontal synchronizing signal H, the data enable signal DE, the color difference signal U/V, and the luminance signal Y that are inputted to the digital video processing circuit 92. FIG. 19 (b) shows the color difference values U and V recognized in the digital video processing circuit 92, and FIG. 19 (c) shows the color difference value U, the color difference value V, and the luminance value Y that are assigned to each pixel by the digital video processing circuit 92. FIG. 19 (d) shows the respective values of the primary color signals R, G, and B obtained on the basis of the color difference value U, the color difference value V, and the luminance value Y.

In the example of FIG. 19 (a), the invalid color difference signal U/V below the standard of the video format and the luminance signal Y are inputted to the digital video processing circuit 92. Here, the values "u0", . . . "u8" of the color difference signal U/V inherently represent the color difference value U, and the values "v0", . . . "v8" of the color difference signal U/V inherently represent the color difference value V.

In the color difference signal U/V and the luminance signal Y in this example, a time period from the rise of the horizontal synchronizing signal H to the first pixel on one scanning line displayed on the screen deviates from a time period T0 defined in the standard for each video format. Therefore, an odd-numbered value and an even-numbered value of the color difference signal U/V with the rise of the horizontal synchronizing signal H used as a basis respectively represent the color difference value V and the color difference value U.

As shown in FIG. 19 (b), the digital video processing circuit 92 alternately recognizes the values of the color difference signal U/V with the rise of the horizontal synchronizing signal H used as a basis as the color difference value U and the color difference value V. That is, the digital video processing circuit 92 recognizes an odd-numbered value and an even-numbered value from the rise of the horizontal synchronizing signal H, respectively, as the color difference value U and the color difference value V irrespective of the data enable signal DE.

Thus, the digital video processing circuit 92 respectively recognizes the values "va1", "v0", "v2", "v4", or "v6" of the color difference signal U/V as the color difference value U, and recognizes the values "u0", "u2", "u4", and "u6" of the color difference signal U/V as the color difference value V, as shown in FIG. 19 (c). Thus, the digital video processing circuit 92 erroneously recognizes the values "v0", "v2", "v4", and "v6" that are inherently the color difference value V as the color difference value U, and erroneously recognizes the values "u0", "u2", "u4", and "u6" that are inherently the color difference value U as the color different value V.

In this case, the digital video processing circuit 92 also respectively assigns each of the color difference values U and each of the color difference values V to two pixels, and assigns each of the luminance values Y to one pixel.

For example, the values "va1" and "u0" of the color difference signal U/V and the value "y0" of the luminance signal Y are respectively assigned to the color difference value U, the color difference value V, and the luminance value Y of the pixel 0, and the values "v0" and "u2" of the color difference signal U/V and the value "y1" of the luminance signal Y are respectively assigned to the color difference value U, the color difference value V, and the luminance value Y of the pixel 1.

As a result, when the digital video processing circuit 92 converts the erroneous color difference value U, the erroneous color difference value V, and the luminance value Y for each pixel, respectively, into the primary color signals R, G, B, as shown in FIG. 19 (d), the respective values of the primary color signals R, G, and B are erroneous.

For example, the values "va1" and "u0" of the color difference signal U/V and the value "y0" of the luminance signal Y of the pixel 0 are respectively converted into values "r0", "g0", and "b0" of the primary color signals. Furthermore, the values "v0" and "u2" of the color difference signal U/V and the value "y1" of the luminance signal Y of the pixel 1 are respectively converted into values "r1", "g1", and "b1" of the primary color signals.

In such a way, the erroneous primary color signals R, G, and B are obtained from the color difference signal U/V and the luminance signal Y. As a result, the color of the video displayed on the screen differs from the original color.

Generally, when the color of the video displayed on the screen by the digital signal receiving apparatus 90 is abnormal, it cannot be presumed that the digital video signal from the external equipment is not proper. Therefore, a user may, in some cases, judge that the digital signal receiving apparatus 90 is faulty.

Even when the invalid digital video signal not accurately conforming to the standard is fed from the external equipment, therefore, it is desired that the digital signal receiving apparatus 90 displays a proper video.

An object of the present invention is to provide a digital signal receiving apparatus and a digital signal receiving method in which an accurate color difference signal can be generated even when a received digital video signal does not accurately conform to a standard.

Means for Solving the Problems (1) In accordance with an aspect of the present invention, a digital signal receiving apparatus that receives a digital signal includes a signal receiver that receives the digital signal, to output a horizontal synchronizing signal having horizontal synchronizing pulses, a vertical synchronizing signal, a luminance signal, a multiplex color difference signal having first and second color difference signals multiplexed therein, and an effective video signal representing an effective video period from the digital signal, a video format detector that detects the video format of the digital signal received by the signal receiver, a color difference processor that sequentially recognizes the value of the multiplex color difference signal outputted from the signal receiver in a predetermined order corresponding to the video format detected by the video format detector as the respective values of the first and second color difference signals in response to the horizontal synchronizing pulses of the horizontal synchronizing signal outputted from the signal receiver, a recognition determination unit that determines whether or not the value of the multiplex color difference signal outputted from the signal receiver conforms to the predetermined order, to determine whether the result of the recognition by the color difference processor is proper or improper, and a recognition reversing unit that reverses the results of the recognition by the color difference processor when the recognition determination unit determines that the result of the recognition by the color difference processor is improper.

In the digital signal receiving apparatus, the signal receiver receives the digital signal, to output the horizontal synchronizing signal having the horizontal synchronizing pulses, the vertical synchronizing signal, the luminance signal, the multiplex color difference signal having the first and second color difference signals multiplexed therein, and the effective video signal representing the effective video period. Furthermore, the video format detector detects the video format of the digital signal received by the signal receiver.

The color difference processor sequentially recognizes the value of the outputted multiplex color difference signal as the respective values of the first and second color difference signals in the predetermined order corresponding to the detected video format in response to the horizontal synchronizing pulses of the horizontal synchronizing signal outputted from the signal receiver.

Here, the recognition determination unit determines whether or not the value of the multiplex color difference signal outputted from the signal receiver conforms to the predetermined order, to determine whether the result of the recognition by the color difference processor are proper or improper. When the recognition determination unit determines that the result of the recognition by the color difference processor are improper, the recognition reversing unit reverses the result of the recognition by the color difference processor.

Even if the color difference processor erroneously recognizes the values of the first and second color difference signals, respectively, as the values of the second and first color difference signals when the multiplex color difference signal whose value does not conform to the proper order is obtained from the received digital signal, therefore, the recognition reversing unit corrects the erroneous result of the recognition.

As a result, even when the received digital video signal does not accurately conform to the standard, the accurate color difference signal can be generated.

(2) The signal receiver may detect a horizontal scanning period of the digital signal, the effective video period, and a second period from the termination of the effective video period to the leading edge of the subsequent horizontal synchronizing pulse on the basis of the horizontal synchronizing signal and the effective video signal, and the recognition determination unit may detect a first period from the leading edge of the horizontal synchronizing pulse to the start of the effective video period on the basis of the horizontal scanning period, the effective video period, and the second period that have been detected by the signal receiver, to determine whether or not the value of the multiplex color difference signal outputted from the signal receiver conforms to the predetermined order on the basis of the detected first period.

In this case, the signal receiver detects the horizontal scanning period, the effective video period, and the second period from the termination of the effective video period to the leading edge of the subsequent horizontal synchronizing pulse of the digital signal.

The recognition determination unit detects the first period from the leading edge of the horizontal synchronizing pulse to the start of the effective video period by the operation on the basis of the horizontal scanning period, the effective video period, and the second period of the detected digital signal.

This allows, even when the first period cannot be directly obtained, the first period to be easily detected by the operation by detecting the horizontal scanning period, the effective video period, and the second period of the digital signal.

Therefore, it is determined whether or not the value of the multiplex color difference signal outputted from the signal receiver conforms to the predetermined order corresponding to the video format on the basis of the detected first period.

(3) The recognition determination unit may acquire the number of pixels corresponding to the detected first period as a first pixel number, to determine whether or not the value of the multiplex color difference signal outputted from the signal receiver conforms to the predetermined order on the basis of a remainder obtained by dividing the acquired first pixel number by a predetermined value.

In this case, the recognition determination unit acquires the number of pixels corresponding to the detected first period as the first pixel number. The recognition determination unit determines whether or not the value of the multiplex color difference signal outputted from the signal receiver conforms to the predetermined order corresponding to the video format on the basis of the remainder obtained by dividing the first pixel number by the predetermined value.

Thus using the remainder obtained by dividing the first pixel number by the predetermined value allows the determination whether or not the value of the multiplex color difference signal outputted from the signal receiver conforms to the predetermined order corresponding to the video format to be easily made.

(4) The digital signal receiving apparatus may further include a first period detector that detects a first period from the leading edge of the horizontal synchronizing pulse to the start of the effective video period on the basis of the horizontal synchronizing signal and the effective video signal that are outputted from the signal receiver, and the recognition determination unit may determine whether or not the value of the multiplex color difference signal outputted from the signal receiver conforms to the predetermined order on the basis of the first period detected by the first period detector.

In this case, the first period detector detects the first period from the leading edge of the horizontal synchronizing pulses to the start of the effective video period. Since the first period detector thus directly detects the first period, it becomes very easy to detect the first period.

Therefore, it is determined whether or not the value of the multiplex color difference signal outputted from the signal receiver conforms to the predetermined order corresponding to the video format on the basis of the detected first period.

(5) The recognition determination unit may acquire the number of pixels corresponding to the detected first period as a first pixel number, to determine whether or not the value of the multiplex color difference signal outputted from the signal receiver conforms to the predetermined order on the basis of a remainder obtained by dividing the acquired first pixel number by a predetermined value.

In this case, the recognition determination unit acquires the number of pixels corresponding to the detected first period as the first pixel number. The recognition determination unit determines whether or not the value of the multiplex color difference signal outputted from the signal receiver conforms to the predetermined order corresponding to the video format on the basis of the remainder obtained by dividing the first pixel number by the predetermined value.

Thus using the remainder obtained by dividing the first pixel number by the predetermined value allows the determination whether or not the value of the multiplex color difference signal outputted from the signal receiver conforms to the predetermined order corresponding to the video format to be easily made.

(6) The digital signal receiving apparatus may further include a primary color signal generator that generates a plurality of primary color signals from the luminance signal and the first and second color difference signals on the basis of the result of the recognition by the color difference processor or the result of the recognition reversed by the recognition reversing unit.

In this case, the primary color signal generator generates the plurality of primary color signals from the values of the luminance signal and the first and second color difference signals recognized by the color difference processor or the values of the luminance signal and the first and second color difference signals reversed by the recognition reversing unit. A video can be displayed on a display device on the basis of the plurality of primary color signals.

(7) The signal receiver may receive the digital signal conforming to the DVI (Digital Visual Interface) standard or the HDMI (High-Definition Multimedia Interface) standard.

(8) In accordance with another aspect of the present invention, a digital signal receiving method for receiving a digital signal includes the steps of receiving the digital signal, to output a horizontal synchronizing signal having horizontal synchronizing pulses, a vertical synchronizing signal, a luminance signal, a multiplex color difference signal having first and second color difference signals multiplexed therein, and an effective video signal representing an effective video period from the digital signal, detecting the video format of the received digital signal, sequentially recognizing the value of the outputted multiplex color difference signal in a predetermined order corresponding to the detected video format as the respective values of the first and second color difference signals in response to the horizontal synchronizing pulse of the outputted horizontal synchronizing signal, determining whether or not the value of the outputted multiplex color difference signal conforms to the predetermined order, to determine whether the result of the recognition in the recognizing step is proper or improper, and reversing the result of the recognition in the recognizing step when it is determined that the result of the recognition is improper.

In the digital signal receiving method, the digital signal is received, to output the horizontal synchronizing signal having the horizontal synchronizing pulses, the vertical synchronizing signal, the luminance signal, the multiplex color difference signal having the first and second color difference signals multiplexed therein, and the effective video signal representing the effective video period. Furthermore, the video format of the received digital signal is detected.

The values of the multiplex color difference signal are sequentially recognized as the respective values of the first and second color difference signals in the predetermined order corresponding to the detected video format in response to the horizontal synchronizing pulses of the outputted horizontal synchronizing signal.

It is determined whether or not the value of the outputted multiplex color difference signal conforms to the predetermined order, to determine whether the result of the recognition sequentially performed in the predetermined order are proper or improper on the basis of the result of the recognition. When it is determined that the result of the recognition are improper, the results of the recognition performed in the predetermined order are reversed.

Even if the values of the first and second color difference signals are erroneously recognized, respectively, as the values of the second and first color difference signals when the multiplex color difference signal whose value does not conform to the proper order is obtained from the received digital signal, therefore, the erroneous result of the recognition are corrected.

As a result, even when the received digital video signal does not accurately conform to the standard, the accurate color difference signal can be generated.

EFFECTS OF THE INVENTION

In the digital signal receiving apparatus according to the present invention, the signal receiver receives the digital signal, to output the horizontal synchronizing signal having the horizontal synchronizing pulse, the vertical synchronizing signal, the luminance signal, the multiplex color difference signal having the first and second color difference signals multiplexed therein, and the effective video signal representing the effective video period. Furthermore, the video format detector detects the video format of the digital signal received by the signal receiver.

The color difference processor sequentially recognizes the value of the outputted multiplex color difference signal as the respective values of the first and second color difference signals in the predetermined order corresponding to the detected video format in response to the horizontal synchronizing pulses of the horizontal synchronizing signal outputted from the signal receiver.

Here, the recognition determination unit determines whether or not the value of the multiplex color difference signal outputted from the signal receiver conforms to the predetermined order, to determine whether the result of the recognition by the color difference processor are proper or improper. When the recognition determination unit determines that the result of the recognition by the color difference processor are improper, the recognition reversing unit reverses the result of the recognition by the color difference processor.

Even if the values of the first and second color difference signals are erroneously recognized, respectively, as the values of the second and first color difference signals when the multiplex color difference signal whose value does not conform to the proper order is obtained from the received digital signal, therefore, the recognition reversing unit corrects the erroneous result of the recognition.

As a result, even when the received digital video signal does not accurately conform to the standard, the accurate color difference signal can be generated.

BRIEF DESCRIPTION OF THE DRAWINGS

FIG. 3 is a diagram showing information stored in the HDMI receiver and the digital video processing circuit as shown in FIG. 1.

FIG. 4 is a diagram showing a video format table previously stored in an MCU.

FIG. 5 is a diagram for comparing a case where the period of reading by the MCU almost coincides with the field period of a video format with a case where the period of reading by the MCU does not coincide with the field period.

FIG. 10 is a diagram for explaining a specific example of reversing processing by a reversing processor shown in FIG. 1.

FIG. 15 is a flow chart of a digital signal receiving program according to the embodiment of the present invention.

BEST MODE FOR CARRYING OUT THE INVENTION

Figure 1:
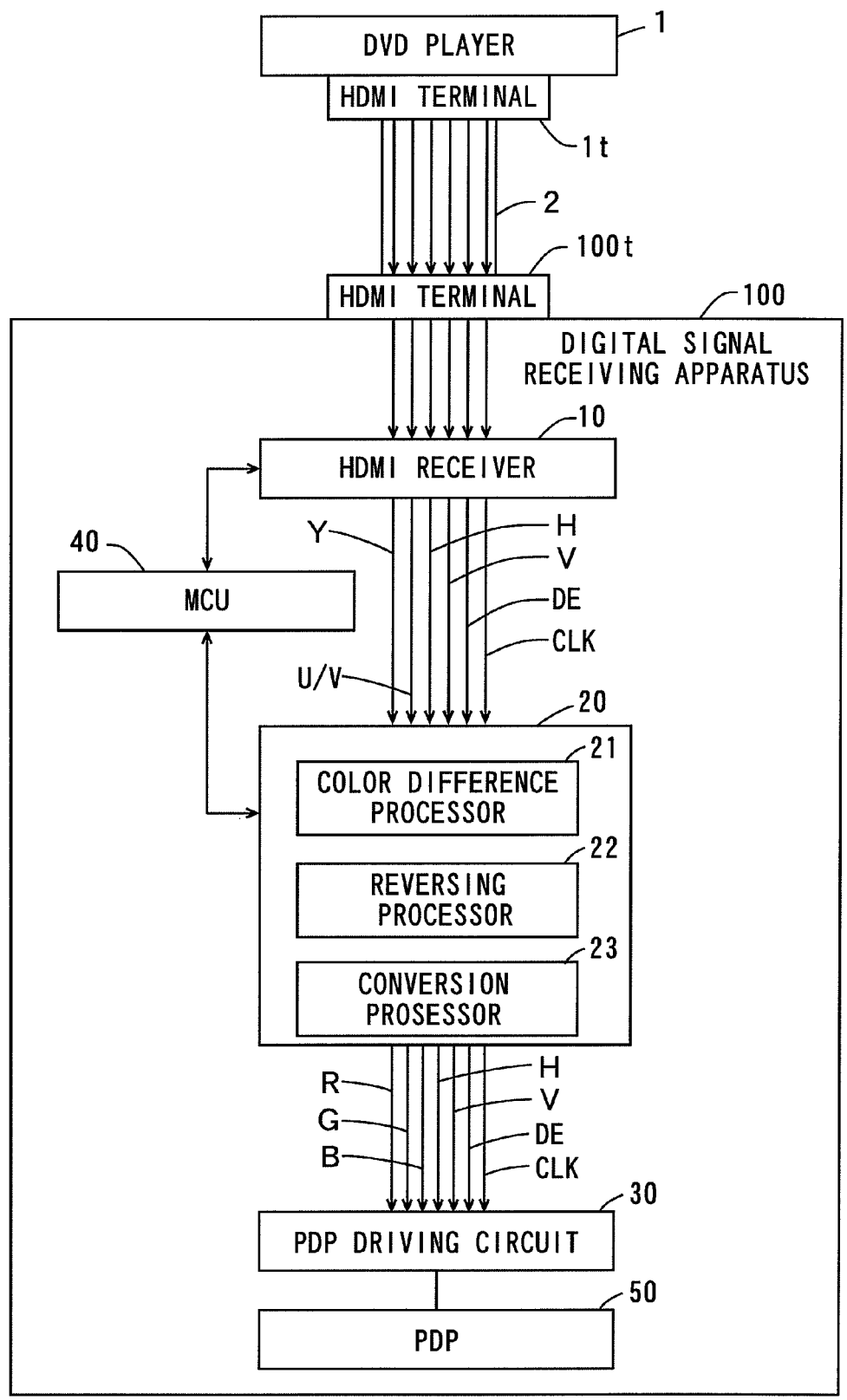
FIG. 1 is a block diagram for explaining a digital signal receiving apparatus conforming to the HDMI standard.

The embodiment of the present invention will be described in detail referring to the drawings. The embodiment below describes a digital signal receiving apparatus and a digital signal receiving method.

(1) Configuration of Digital Signal Receiving Apparatus

FIG. 1 is a block diagram for explaining a digital signal receiving apparatus conforming to the HDMI (High-Definition Multimedia Interface) standard. FIG. 1 shows a plasma display device as an example of the digital signal receiving apparatus.

A digital signal receiving apparatus 100 includes an HDMI receiver 10, a digital video processing circuit 20, a PDP (Plasma Display Panel) driving circuit 30, an MCU (Microcomputer Unit) 40, and a PDP (Plasma Display Panel) 50. Furthermore, the digital video processing circuit 20 includes a color difference processor 21, a reversing processor 22, and a conversion processor 23.

The digital signal receiving apparatus 100 is provided with an HDMI terminal 100t. A DVD (Digital Versatile Disc) player 1 having an HDMI terminal 1t is connected to the HDMI terminal 100t through an HDMI cable 2.

The DVD player 1 transmits a digital video signal conforming to the HDMI standard to the HDMI receiver 10 in the digital signal receiving apparatus 100 through the HDMI terminal 1t, the HDMI cable 2, and the HDMI terminal 100t in a transmission format conforming to the TMDS (Transmission Minimized Differential Signaling) standard.

The HDMI receiver 10 decodes the received digital video signal, and transmits to the digital video processing circuit 20 a luminance signal Y, a color difference signal U/V, a horizontal synchronizing signal H, a vertical synchronizing signal V, a data enable signal DE, and a sampling clock signal CLK that conform to ITU (International Telecommunication Union)-R BT.601. The color difference signal U/V has two types of color difference signals U and V alternately multiplexed therein.

In the present embodiment, the luminance signal Y, the color difference signal U, and the color difference signal V have a color difference format of 4:2:2. The data enable signal DE represents an effective video period in the horizontal direction.

Furthermore, the HDMI receiver 10 detects information (the number of horizontal pixels hr and the number of vertical scanning lines vr, described later) relating to the video format of the received digital video signal, and stores information relating to the video format in its self-contained register.

The MCU 40 reads the information relating to the video format stored in the register of the HDMI receiver 10, and controls the digital video processing circuit 20 on the basis of the information.

In the digital video processing circuit 20, the color difference processor 21 recognizes the value of the color difference signal U and the value of the color difference signal V for each pixel from the color difference signal U/V in accordance with the control by the MCU 40, and assigns the value of the luminance signal Y and the respective recognized values of the color difference signals U and V to the pixel. This processing by the color difference processor 21 is hereinafter referred to as color difference processing.

The reversing processor 22 respectively considers, when the value of the color difference signal U and the value of the color difference signal V that have been recognized by the color difference processor 21 should be inherently recognized, respectively, as the value of the color difference signal V and the value of the color difference signal U, the value of the color difference signal U and the value of the color difference signal V that have been assigned to each pixel by the color difference processor 21, respectively, as the value of the color difference signal V and the value of the color difference signal U. This processing by the MCU 40 and the reversing processor 22 is hereinafter referred to as reversing processing.

The conversion processor 23 converts the value of the luminance signal Y for each pixel and the values of the color difference signals U and V for the pixel finally recognized by the color difference processor 21 and the reversing processor 22, respectively, into the values of primary color signals R, G, and B. This processing by the conversion processor 23 is hereinafter referred to as primary color conversion processing.

The digital video processing circuit 20 feeds to the PDP driving circuit 30 the primary color signals R, G, and B, the horizontal synchronizing signal H, the vertical synchronizing signal V, the data enable signal DE, and the sampling clock signal CLK.

Furthermore, the digital video processing circuit 20 has information (a first blanking pixel number, described later) used for the reversing processing stored in its self-contained register.

The PDP driving circuit 30 displays a video on a screen of the PDP 50 on the basis of the primary color signals R, G, and B, the horizontal synchronizing signal H, the vertical synchronizing signal V, the data enable signal DE, and the sampling clock signal CLK.

Figure 2:
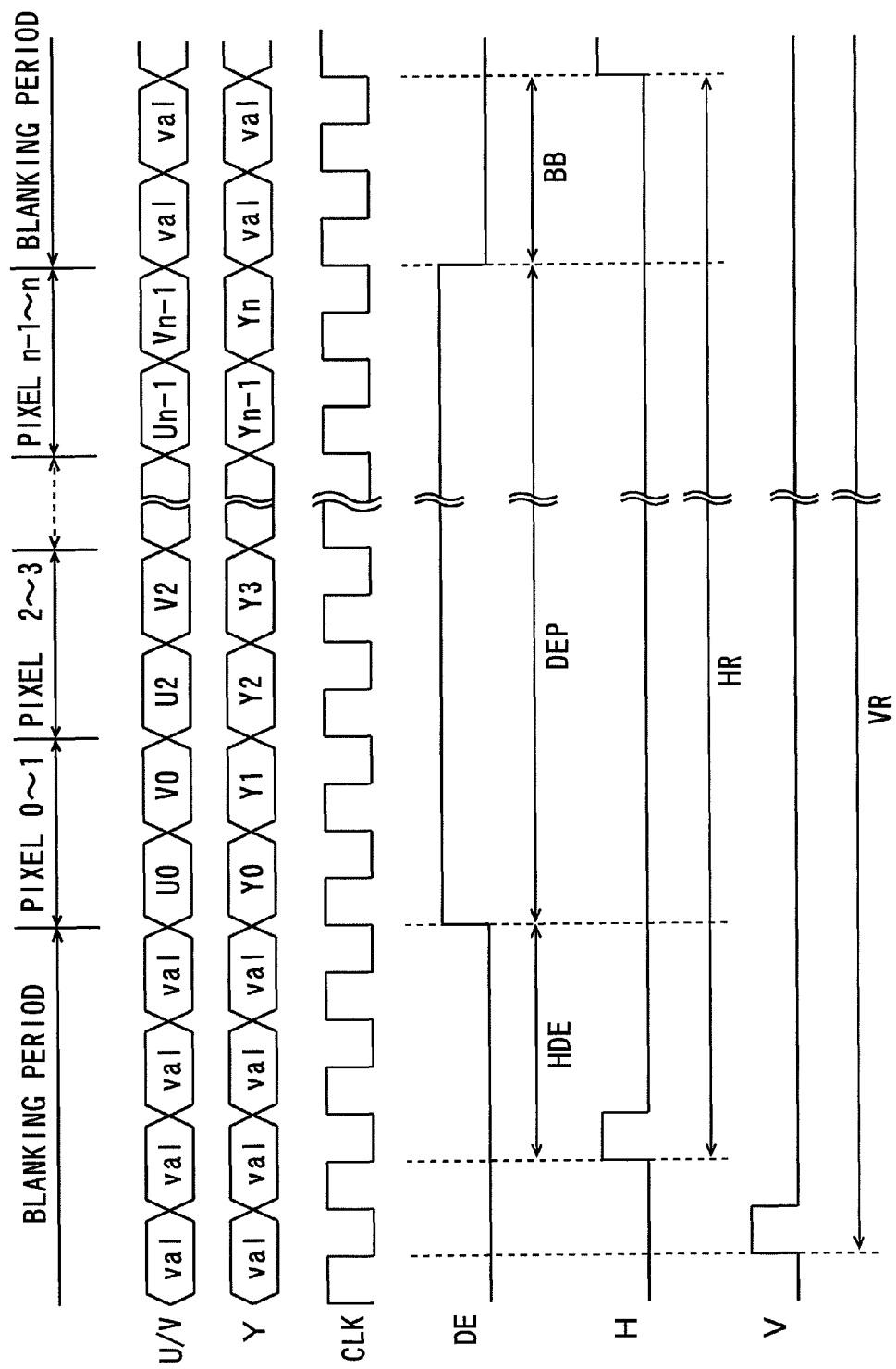
FIG. 2 is a timing chart showing an example of signals transmitted from an HDMI receiver to a digital video processing circuit as shown in FIG. 1.

(2) Signals Transmitted from HDMI Receiver to Digital Video Processing Circuit FIG. 2 is a timing chart showing an example of signals transmitted from the HDMI receiver 10 to the digital video processing circuit 20 as shown in FIG. 1. In this example, the horizontal synchronizing signal H, the data enable signal DE, the color difference signal U/V, and the luminance signal Y that conform to an interlace system having 1125 horizontal scanning lines and having a field frequency of 60 Hz will be described.

FIG. 2 shows the color difference signal U/V, the luminance signal Y, the sampling clock signal CLK, the data enable signal DE, the horizontal synchronizing signal H, and the vertical synchronizing signal V.

One period of the sampling clock signal CLK corresponds to one pixel. One period of the sampling clock signal CLK is hereinafter referred to as one clock.

In this example, the color difference signal U/V alternately includes the values of the color difference signal U and the values of the color difference signal V in the period of the sampling clock signal CLK. When the values of the color difference signals U and V are distinguished, the value of the color difference signal U and the value of the color difference signal V are hereinafter referred to as a color difference value U and a color difference value V.

For example, the color difference value U and the color difference value V of a pixel 0 are respectively "U0" and "V0", and the color difference value U and the color difference value V of a pixel 1 are also respectively "U0" and "V0". The two color difference values U and V common to the two pixels are thus assigned to each of the pixels.

The luminance signal Y includes a value for each pixel in the period of the sampling clock signal CLK. The value of the luminance signal Y is hereinafter referred to as a luminance value Y.

For example, the luminance value Y of the pixel 0 is "Y0", and the luminance value Y of the pixel 1 is "Y1". Thus, one luminance value Y is assigned to one pixel.

Various types of related information such as information relating to a color difference format, control information, and sound information are multiplexed in a blanking period of the color difference signal U/V and the luminance signal Y.

In FIG. 2, the related information multiplexed in the blanking period of the color difference signal U/V and the luminance signal Y is represented by "val".

A time period during which the data enable signal DE is at a high level represents an effective video period DEP in the horizontal direction.

A time period during which the data enable signal DE is at a low level corresponds to the blanking period. Note that the time period during which the data enable signal DE is at a low level corresponds to a horizontal blanking period in FIG. 2.

In the present embodiment, a time period from the rise of the horizontal synchronizing signal H to the rise of the data enable signal DE in the time period during which the data enable signal DE is at a low level is herein referred to a first blanking period HDE.

Furthermore, a time period from the fall of the data enable signal DE to the rise of the subsequent horizontal synchronizing signal H in the time period during which the data enable signal DE is at a low level is referred to a second blanking period BB.

In FIG. 2, a horizontal scanning period is indicated by an arrow HR, and a vertical scanning period is indicated by an arrow VR.

A video composed of a plurality of pixels is displayed on the screen of the PDP 50 on the basis of the color difference signal U/V and the luminance signal Y in the effective video period DEP.

The horizontal scanning period HR, the vertical scanning period VR, the first blanking period HDE, the effective video period DEP, and the second blanking period BB are previously determined in conformity with the above-mentioned video format.

When an invalid digital video signal not conforming to the standard of the video format is fed, however, the first blanking period may, in some cases, differ from a period previously determined by the standard.

When processing is performed on the assumption that the fed digital video signal conforms to the standard of the video format at this time, the color of the video displayed on the screen of the PDP 50 may, in some cases, differ from the original color.

In the digital signal receiving apparatus 100 according to the present embodiment, even when the invalid digital video signal is fed, the first blanking period HDE is correctly detected. This allows the video to be displayed in the original color on the screen of the PDP 50. Accurate detection processing of the first blanking period HDE will be described later.

(3) Contents of Information Stored in Each Constituent Unit

As described in the foregoing, each of the HDMI receiver 10 and the digital video processing circuit 20 as shown in FIG. 1 has various types of information stored in its self-contained register. The information respectively stored in the HDMI receiver 10 and the digital video processing circuit 20 will be described.

FIG. 3 is a diagram showing the information respectively stored in the HDMI receiver 10 and the digital video processing circuit 20 as shown in FIG. 1.

FIG. 3 (*a*) shows the contents of the information stored in the register of the HDMI receiver 10.

As described in the forgoing, the HDMI receiver 10 decodes the digital video signal received from the DVD player 1, and transmits to the digital video processing circuit 20 the luminance signal Y, the color difference signal U/V, the horizontal synchronizing signal H, the vertical synchronizing signal V, the data enable signal DE, and the sampling clock signal CLK that conform to ITU-R BT.601.

Here, the HDMI receiver 10 detects the number of clocks in the horizontal scanning period HR on the basis of the horizontal synchronizing signal H and the sampling clock signal CLK that have been decoded, to store the number of pixels in the horizontal direction as a horizontal pixel number hr in the register.

The HDMI receiver 10 detects the number of pulses of the horizontal synchronizing signal H in the vertical scanning period HR on the basis of the vertical synchronizing signal V and the horizontal synchronizing signal H that have been decoded, to store the number of scanning lines in the vertical direction as a vertical scanning line number vr in the register.

Furthermore, the HDMI receiver 10 detects the number of clocks in the effective video period DFP on the basis of the data enable signal DE and the sampling clock signal CLK that have been decoded, to store the number of pixels displayed on the screen on one scanning line in the horizontal direction as an effective horizontal pixel number dep in the register.

The HDMI receiver 10 detects the number of clocks in the second blanking period BB on the basis of the horizontal synchronizing signal H, the data enable signal DE, and the sampling clock signal CLK that have been decoded, to store the number of pixels from the pixel subsequent to the last pixel on one scanning line displayed on the screen to the rise of the subsequent horizontal synchronizing signal H as a second blanking pixel number bb in the register.

FIG. 3 (*b*) shows the contents of the information stored in the register of the digital video processing circuit 20.

The digital video processing circuit 20 detects the number of clocks in the first blanking period HDE on the basis of the horizontal synchronizing signal H, the data enable signal DE, and the sampling clock signal CLK that are transmitted from the HDMI receiver 10, to store the number of pixels from the rise of the horizontal synchronizing signal H to the first pixel on one scanning line displayed on the screen as a first blanking pixel number hde in the register.

(4) Video Format Table Stored in MCU

As described in the foregoing, the MCU 40 reads the information relating to the video format stored in the register of the HDMI receiver 10, and controls the digital video processing circuit 20 on the basis of the information.

Here, the information relating to the video format stored in the register of the HDMI receiver 10 means the horizontal pixel number hr and the vertical scanning line number vr.

In the standard of the video format, the horizontal pixel number hr and the vertical scanning line number vr are previously determined.

The MCU 40 contains a storage, and the storage stores a video format table representing the horizontal pixel number hr and the vertical scanning line number vr determined for each video format.

FIG. 4 is a diagram showing the video format table previously stored in the MCU 40. In a video format shown in FIG. 4, a symbol "I" indicates that the video format conforms to an interlace system, and a symbol "P" indicates that the video format conforms to a progressive system. In the video format table, for each video format, the respective values of the horizontal scanning number hr and the vertical scanning line number vr are related thereto.

Note that the horizontal pixel number hr and the vertical scanning line number vr are respectively determined to be predetermined values for each video format. However, in the present embodiment, values in a predetermined range centered at a value determined in the standard are related to each video format such that the video format can be specified even if a slight difference occurs between the respective values of the horizontal pixel number hr and the vertical scanning line number vr that are actually detected by the HDMI receiver 10.

As shown in FIG. 4, a horizontal pixel number hr from 790 to 810 and a vertical scanning line number vr from 515 to 535 are related to a video format VGA (Video Graphics Array), for example.

Furthermore, a horizontal pixel number hr from 848 to 868 and a vertical scanning line number vr from 515 to 535 are related to a video format 525P (60 Hz).

Thus, the MCU 40 determines the video format of the digital video signal received from the DVD player 1 on the basis of the horizontal pixel number hr and the vertical scanning line number vr that have been read from the HDMI receiver 10 and the video format table shown in FIG. 4.

The MCU 40 controls the operation of the digital video processing circuit 20 on the basis of the determined video format.

(5) Accurate Detection of First Blanking Pixel Number

As described in the foregoing, the color difference signal U/V transmitted from the HDMI receiver 10 to the digital video processing circuit 20 alternately includes the color difference values U and the color difference values V in a predetermined period conforming to the video format.

At the time of color difference processing, the digital video processing circuit 20 alternately recognizes the values included in the color difference signal U/V as the color difference value U and the color difference value V for each pixel (for each clock) with the rise of the horizontal synchronizing signal H used as a basis when the video format of the received digital video signal is other than 525I (60 Hz) and 625I (50 Hz), for example.

An operation for recognizing the color difference signal U/V is previously set for the video format of the received digital video signal. This causes the digital video processing circuit 20 to perform the previously set operation for recognizing the color difference signal U/V in accordance with the video format determined by the MCU 40.

Here, when the first blanking pixel number hde does not conform to the standard of the video format, a value that should be inherently recognized as the color difference value U may be recognized as the color difference value V, and a value that should be inherently recognized as the color difference value V may be recognized as the color difference value U. Thus, an error may, in some cases, occur in the operation for recognizing the color difference signal U/V.

In the present embodiment, the MCU 40 accurately detects the first blanking pixel number hde. The MCU 40 controls the reversing processor 22 in the digital video processing circuit 20 on the basis of the accurately detected first blanking pixel number hde.

When an error occurs in the operation for recognizing the color difference signal U/V in the color difference processor 21 shown in FIG. 1, therefore, the reversing processor 22 subjects the color difference value U and the color difference value V to the above-mentioned reversing processing.

The MCU 40 detects the first blanking pixel number hde by two types of methods. Description is now made of the method for detecting the first blanking pixel number hde.

(6) Method for Detecting First Blanking Pixel Number (6-a) Method for Detection by Counting The digital video processing circuit 20 counts the number of clocks in the first blanking period HDE shown in FIG. 2 on the basis of the horizontal synchronizing signal H, the data enable signal DE, and the sampling clock signal CLK that are transmitted from the HDMI receiver 10.

Thus, a value obtained by counting the sampling clock signal CLK is stored as the first blanking pixel number hde in the register of the digital video processing circuit 20, as described above.

Therefore, the MCU 40 reads the first blanking pixel number hde stored in the register of the digital video processing circuit 20, to detect the first blanking pixel number hde. Such detection of the first blanking pixel number hde is hereinafter referred to as counting detection.

(6-b) Method for Detection by Operation

As shown in FIG. 3, the HDMI receiver 10 has the horizontal pixel number hr, the effective horizontal pixel number dep, and the second blanking pixel number bb stored in its self-contained register.

Here, the MCU 40 reads the horizontal pixel number hr, the effective horizontal pixel number dep, and the second blanking pixel number bb that are stored in the register of the HDMI receiver 10.

The MCU 40 subtracts the effective horizontal pixel number dep and the second blanking pixel number bb from the read horizontal pixel number hr. Thus, the MCU 40 can detect the first blanking pixel number hde from the results of the subtraction. The detection of the first blanking pixel number hde is hereinafter referred to as operation detection.

(6-c) Proper Use of Detecting Methods

In the present embodiment, methods for detecting the first blanking pixel number hde by the MCU 40 are properly used depending on the field frequency of the video format.

Specifically, the MCU 40 performs counting detection when the field frequency of the video format of the received digital video signal is 50 Hz, while performing operation detection when the field frequency of the video format thereof is 60 Hz.

(7) Reason why Methods for Detecting First Blanking Pixel Number are Properly Used The reason why counting detection and operation detection are properly used will be described.

(7-a) Reason why Operation Detection is Performed when Field Frequency is 60 Hz

When the field frequency of the video format of the received digital video signal is 60 Hz, the field period is 16.7 ms. Therefore, the vertical scanning period VR in this case is 16.7 ms.

Generally, the setting of the operation of each of constituent elements in the digital signal receiving apparatus 100 is updated for each field. In the present embodiment, therefore, the period of the timing of the reading from the register of the digital video processing circuit 20 by the MCU 40 is set to 16 ms, for example. The period of the timing of the reading will be hereinafter referred to as the period of reading.

When the field frequency of the video format is 60 Hz, the following problems occur by the MCU 40 performing counting detection.

FIG. 5 is a diagram for comparing a case where the period of reading by the MCU 40 and the field period of the video format almost coincide with each other with a case where the period of reading by the MCU 40 and the field period do not coincide with each other.

FIG. 5 (*a*) shows, as an example of the case where the period of reading by the MCU 40 almost coincides with the field frequency of the video format, a case where the period of reading is 16 ms with the field period being 16.7 ms (the field frequency being 60 Hz).

As shown in FIG. 5 (*a*), a vertical blanking period VB exists over a predetermined time period including the vertical synchronizing signal V.

Here, in the digital signal receiving apparatus 100 according to the present embodiment, the first blanking pixel number hde is stored in 8 bits in the register of the digital video processing circuit 20. Note that in the vertical blanking period VB, the value of the first blanking pixel number hde stored in the register of the digital video processing circuit 20 is held at 255 serving as the maximum value that can be counted by a 8-bit register.

When the timing of reading RT1 by the MCU 40 is set in the vertical blanking period VB once with the period of reading almost coinciding with the field period of the video format, the subsequent timings of reading RT2 to RT6 are continuously set in the vertical blanking period VB.

In this case, the value of the first blanking pixel number hde stored in the register of the digital video processing circuit 20 is always 255, as described above. This makes it impossible for the MCU 40 to obtain an accurate value of the first blanking pixel number hde.

When the period of reading is thus set to 16 ms with the field frequency of the video format being 60 Hz, the MCU 40 cannot accurately detect the first blanking pixel number hde.

In the digital signal receiving apparatus 100 according to the present embodiment, when the field frequency of the video format is 60 Hz, therefore, the MCU 40 performs operation detection without performing counting detection.

On the other hand, FIG. 5 (*b*) shows, as an example of the case where the period of reading by the MCU 40 does not coincide with the field frequency of the video format, a case where the period of reading is 16 ms with the field period being 20 ms (the field frequency being 50 Hz).

As described in the foregoing, a vertical blanking period VB exists over a predetermined period including the vertical synchronizing signal V.

Even if the timing of reading RT1 by the MCU 40 is set in the vertical blanking period VB once with the period of reading not coinciding with the field period of the video format, the subsequent timings of reading RT2 to RT6 are not continuously set in the vertical blanking period VB.

Although the timings of reading RT1 and RT2 are set in the vertical blanking period VB in FIG. 5 (*b*), the timings of reading RT3 to RT6 are set outside the vertical blanking period VB.

As a result, the MCU 40 can obtain an accurate value of the first blanking pixel number hde from the register of the digital video processing circuit 20 at the timings of reading RT3 to RT6 set outside the vertical blanking period VB.

In the digital signal receiving apparatus 100 according to the present embodiment, when the field frequency of the video format is 50 Hz, therefore, the MCU 40 performs counting detection.

Specifically, the MCU 40 holds the values of the first blanking pixel number hde read from the digital video processing circuit 20 for each timing of reading, and defines, when the held values coincide with each other continuously three times, the values as the first blanking pixel number hde, to detect an accurate value of the first blanking pixel number hde. The details will be described later.

(7-b) Reason why Counting Detection is Performed when Field Frequency is 50 Hz

Description was made of the reason why the MCU 40 performs operation detection without performing counting detection when the field frequency is 60 Hz.

Even when the field frequency is 50 Hz, therefore, the operation of the MCU 40 is unified if the MCU 40 can detect the first blanking pixel number hde by performing operation detection.

In the digital signal receiving apparatus 100 according to the present embodiment, the horizontal pixel number hr and the vertical scanning line number vr shown in FIG. 3 are respectively stored in 13 bits and 11 bits in the register of the HDMI receiver 10 shown in FIG. 1. Furthermore, the effective horizontal pixel number dep is stored in 12 bits, and the second blanking pixel number bb is stored in 8 bits.

When the field frequency of the video format is 50 Hz, therefore, the following problems occur by the MCU 40 performing operation detection.

Figure 6:
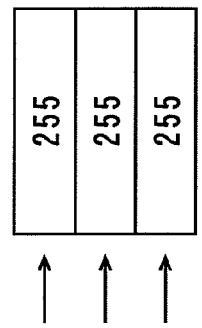
FIG. 6 is a diagram showing an example of information stored in a register of the HDMI receiver shown in FIG. 1.

FIG. 6 is a diagram showing an example of the information stored in the register of the HDMI receiver 10 shown in FIG. 1.

As shown in FIG. 6, when the HDMI receiver 10 shown in FIG. 1 receives the digital video signal having the video format 525 P (60 Hz), for example, 858, 525, 720, and 16 are respectively stored as the values of the horizontal pixel number hr, the vertical scanning line number vr, the effective horizontal pixel number dep, and the second blanking pixel number bb in the register of the HDMI receiver 10.

FIG. 6 shows an example of the respective values of the horizontal pixel number hr, the vertical scanning line number vr, the effective horizontal pixel number dep, and the second blanking pixel number bb in a case where digital video signals having a plurality of video formats in addition to the video format 525 P (60 Hz) are received.

Here, in the present embodiment, the second blanking pixel number bb is stored in 8 bits in the register of the HDMI receiver 10, as described above. Thus, the value of the second blanking pixel number bb stored in the register of the HDMI receiver 10 is a maximum of 255.

In the video format having a field frequency of 50 Hz, however, the value of the second blanking pixel number bb may, in some cases, exceed 255. In this case, the value of the second blanking pixel number bb stored in the register of the HDMI receiver 10 is 255.

Although in the video formats 750P (50 Hz), 1125I (50 Hz), and 1125P (50 Hz), the values of the second blanking pixel number bb are respectively 440, 528, and 528 (see a solid-framed portion in FIG. 6), for example, all the values actually stored in the register are 255.

When the first blanking pixel number hde is obtained by operation detection, as described above, the first blanking pixel number hde obtained by the operation detection cannot be accurately detected if the second blanking pixel number bb stored in the register of the HDMI receiver 10 is an erroneous value.

In the digital signal receiving apparatus 100 according to the present embodiment, when the field frequency of the video format is 50 Hz, therefore, the MCU 40 performs counting detection without performing operation detection.

(7-c) Another Example of Method for Detecting First Blanking Pixel Number

As described in the foregoing, in the present embodiment, when the field frequency of the received digital video signal is 60 Hz, the period of reading by the MCU 40 is set substantially equal to the field period. Therefore, the first blanking pixel number hde is detected by operation detection.

If the period of reading by the MCU 40 can be set to a value different from the field period 60 Hz and 50 Hz, therefore, the first blanking pixel number hde can be accurately detected by counting detection in both cases where the field frequency is 60 Hz and the field frequency is 50 Hz.

On the other hand, in the present embodiment, when the field frequency of the received digital video signal is 50 Hz, the number of bits of the second blanking pixel number bb stored in the register of the HDMI receiver 10 is set to 8 bits. Therefore, the first blanking pixel number hde is detected by counting detection.

If the number of bits of the second blanking pixel number bb stored in the register of the HDMI receiver 10 can be set larger than 8 bits (e.g., 10 bits), therefore, the first blanking pixel number hde can be accurately detected by operation detection in both cases where the field frequency is 60 Hz and the field frequency is 50 Hz.

(8) Arrangement of Color Difference Values Transmitted to Digital Video Processing Circuit In the present embodiment, the sampling frequency of the HDMI receiver 10 that receives the digital video signal from the DVD player 1 is 27 MHz.

The frequency of the sampling clock signal for the digital video signal differs between the video formats 525I (60 Hz) and 625I (50 Hz) and the other video formats.

In the video formats 525I (60 Hz) and 625I (50 Hz), the frequency of the sampling clock signal is set to 13.5 MHz.

On the other hand, in the video formats other than 525I (60 Hz) and 625I (50 Hz), the frequency of the sampling clock signal is set to 27 MHz.

Examples of the video formats other than 525I (60 Hz) and 625I (50 Hz) include VGA, 750P (60 Hz), and 1125I (60 Hz), as shown in FIG. 4, for example.

Therefore, the arrangement of the color difference values U and the color difference values V that are transmitted to the digital video processing circuit 20 differs between the video formats 525I (60 Hz) and 625I (50 Hz) and the other video formats.

(8-a) Case where Video Format is Other than 525I (60 Hz) and 625I (50 Hz)

When the video format is other than 525I (60 Hz) and 625I (50 Hz), the sampling frequency of the HDMI receiver 10 and the frequency of the sampling clock signal for the digital video signal coincide with each other.

Thus, the arrangement of the color difference values U and the color difference values V that are transmitted from the HDMI receiver 10 to the digital video processing circuit 20 is equal to the arrangement of the color difference values U and the color difference values V that are received by the HDMI receiver 10.

That is, the color difference values U and the color difference values V are alternately transmitted for each clock to the digital video processing circuit 20.

(8-b) Case where Video Format is 525I (60 Hz) and 625I (50 Hz)

When the video format is 525I (60 Hz) and 625I (50 Hz), the sampling frequency of the HDMI receiver 10 is two times the frequency of the sampling clock signal for the digital video signal. Thus, one clock of the sampling clock signal for the digital video signal corresponds to two clocks in the HDMI receiver 10.

When the color difference values U and the color difference values V are alternately transmitted for each clock of the sampling clock signal for the digital video signal, therefore, the HDMI receiver 10 transmits the received color difference values U and V to the digital video processing circuit 20 every two clocks.

That is, the color difference values U and the color difference values V are alternately transmitted every two clocks to the digital video processing circuit 20.

(9) Color Difference Signal Recognized by Digital Video Processing Circuit and Erroneous Recognition of Color Difference Signal As described in the foregoing, in the digital video processing circuit 20, the color difference processor 21 sequentially recognizes the color difference values U and V from the color difference signal U/V for each pixel.

This recognizing operation is previously set in the color difference processor 21 for each video format. The recognizing operation of the color difference signal U/V set in the color difference processor 21 and the erroneous recognition of the color difference signal U/V will be described on the basis of FIG. 7.

Figure 7:
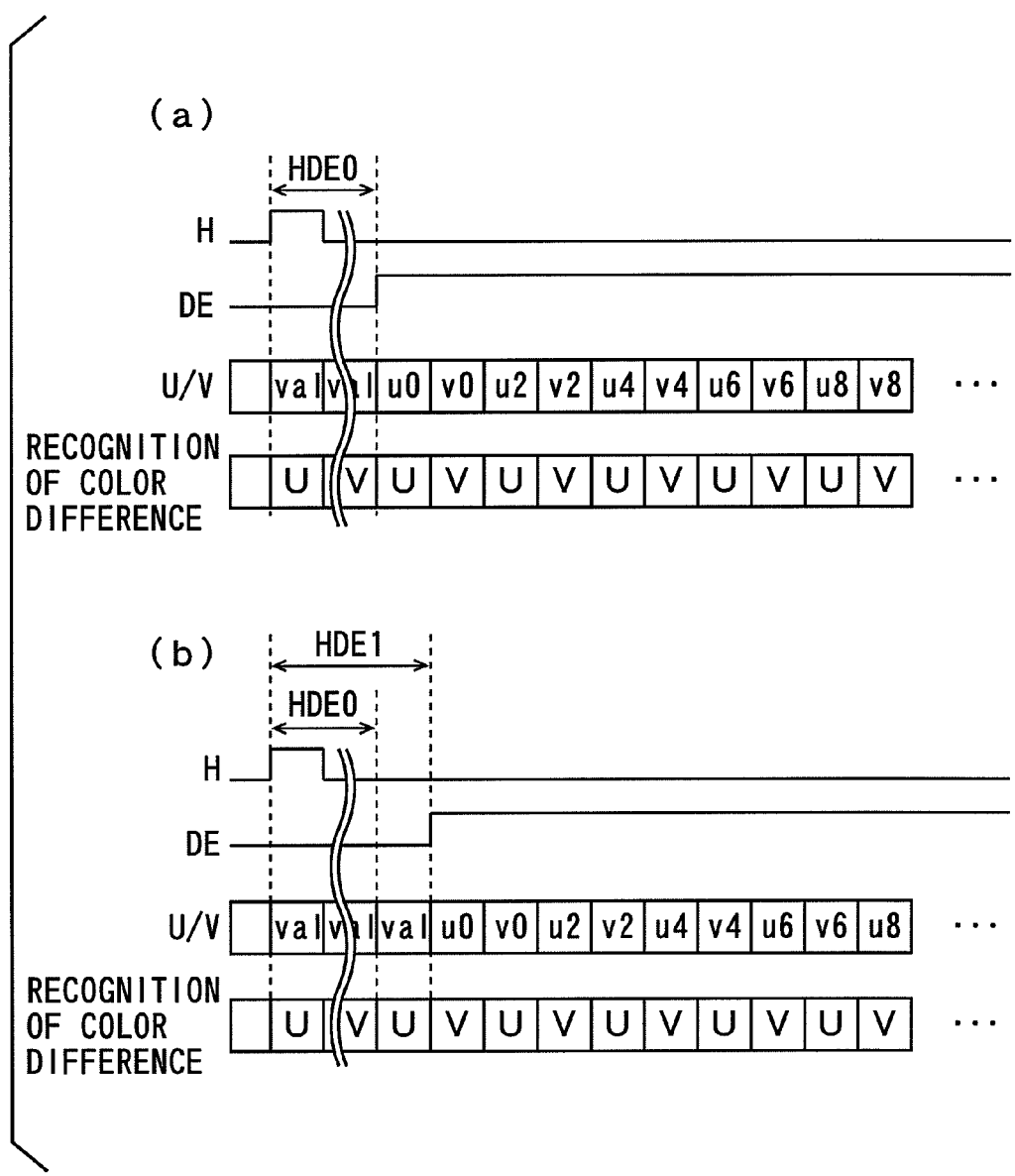
FIG. 7 is a diagram for explaining a recognizing operation of a color difference signal set in a color difference processor shown in FIG. 1 and erroneous recognition of the color difference signal.
Figure 8:
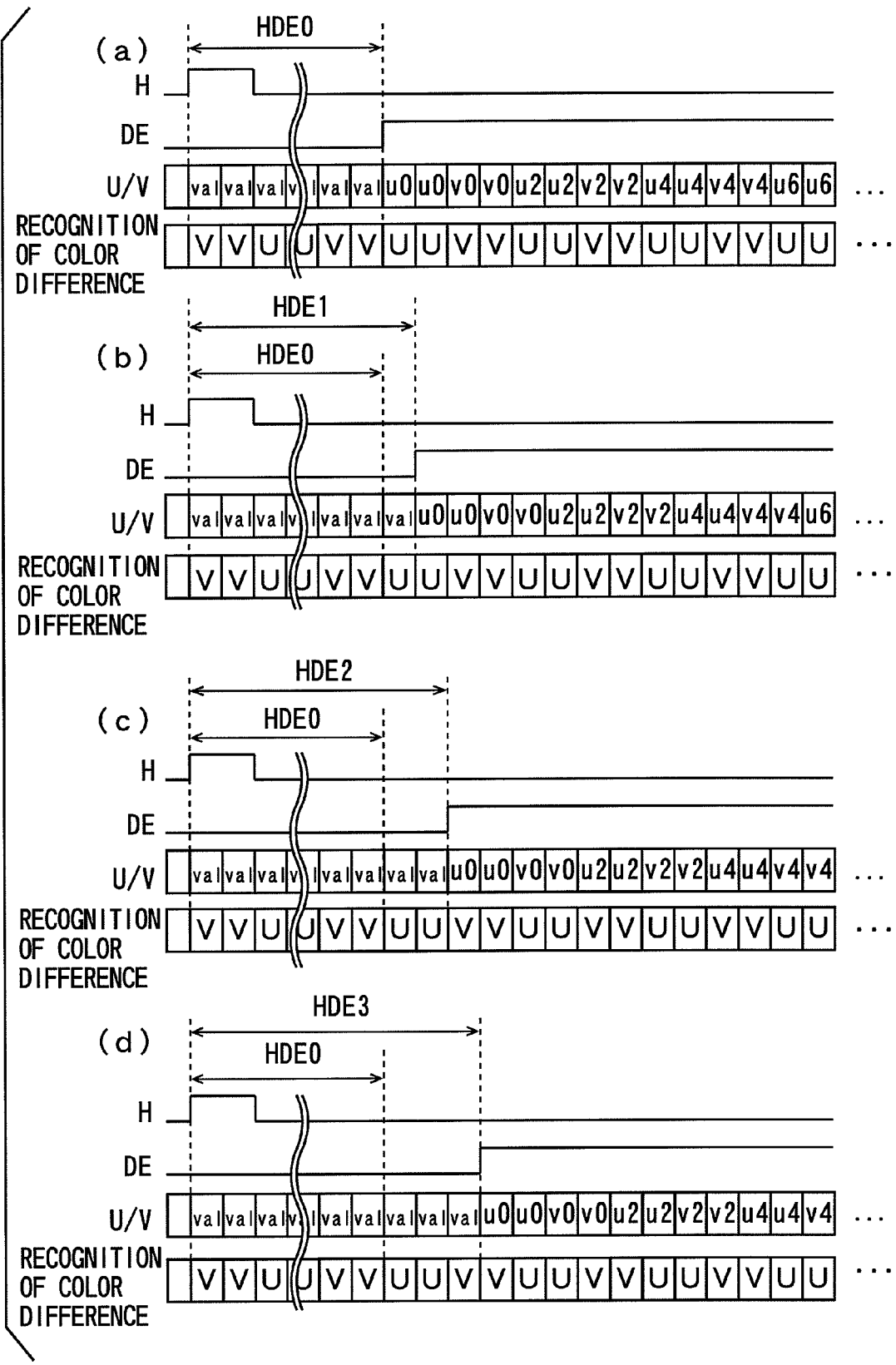
FIG. 8 is a diagram for explaining a recognizing operation of a color difference signal set in the color difference processor shown in FIG. 1 and erroneous recognition of the color difference signal.
Figure 9:
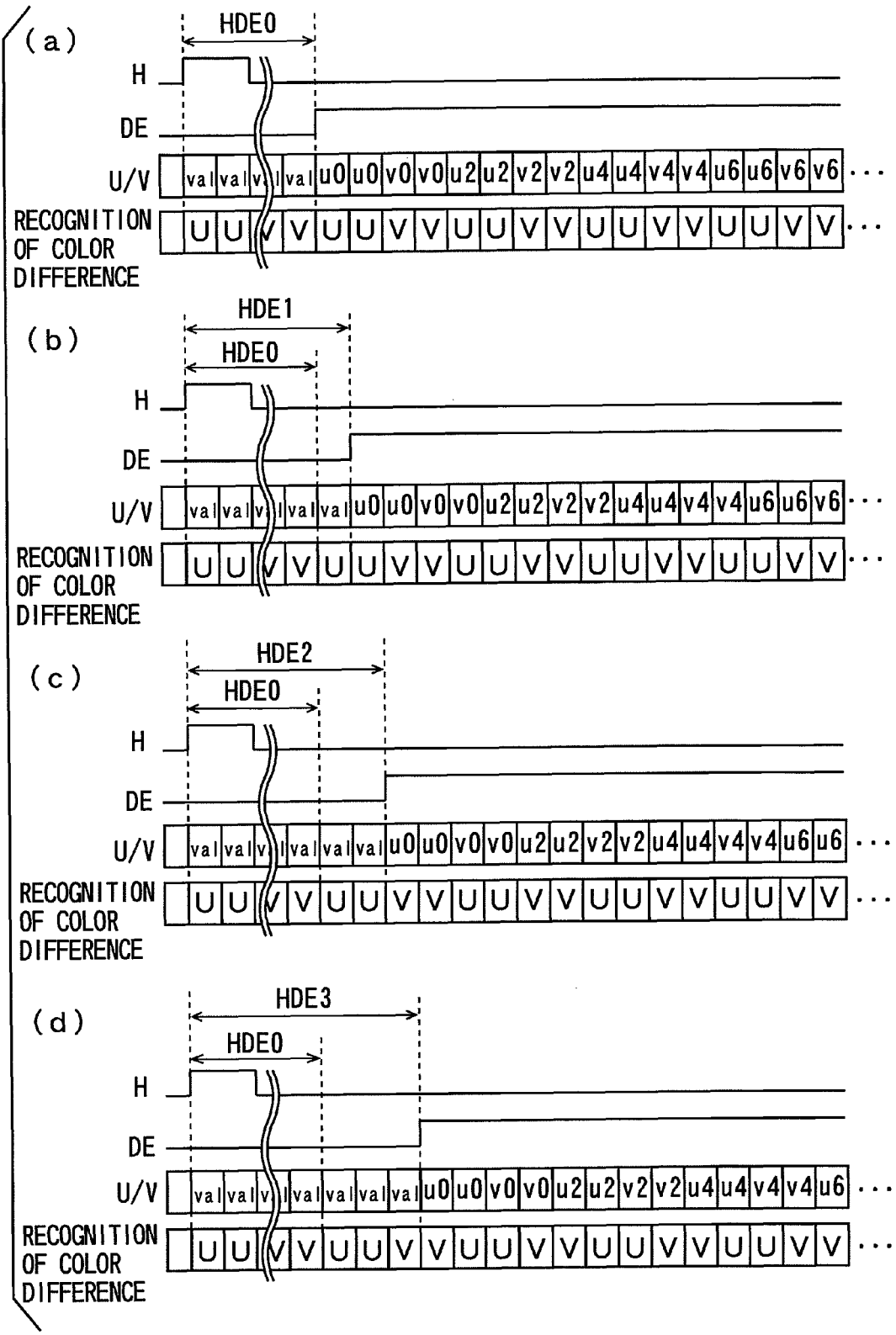
FIG. 9 is a diagram for explaining a recognizing operation of a color difference signal set in the color difference processor shown in FIG. 1 and erroneous recognition of the color difference signal.

FIGS. 7 to 9 are diagrams for explaining the recognizing operation of the color difference signal U/V set in the color difference processor 21 shown in FIG. 1 and the erroneous recognition of the color difference signal U/V.

(9-a) Case where Video Format is Other than 525I (60 Hz) and 625I (50 Hz)

An operation for recognizing the color difference signal U/V in a case where the video format is other than 525I (60 Hz) and 625I (50 Hz) will be described on the basis of FIG. 7 (a).

FIG. 7 (a) shows an example of the horizontal synchronizing signal H, the data enable signal DE, and the color difference signal U/V that are transmitted to the digital video processing circuit 20. The signals conform to the video formats other than 525I (60 Hz) and 625I (50 Hz).

As shown in FIG. 7 (*a*), the horizontal synchronizing signal H and the data enable signal DE are inputted to the digital video processing circuit 20. When the horizontal synchronizing signal H and the data enable signal DE accurately conform to the standard of the video format, the first blanking period HDE also conforms to the standard of the video format.

In this example, the first blanking period HDE conforming to the standard is referred to as a first standard blanking period HDE0. In the video formats other than 525I (60 Hz) and 625I (50 Hz), the number of clocks in the first standard blanking period HDE0, that is, a first standard blanking pixel number hde0 is set to an even number.

Furthermore, the color difference signal U/V is inputted to the digital video processing circuit 20. Here, the color difference signal U/V includes values "u0", "v0", ... "u8", "v8" in this order for each clock. Note that the color difference signal U/V includes values "val" of related information in the first standard blanking period HDE0.

The values "u0", ... "u8" of the color difference signal U/V inherently represent the color difference value U, and the values "v0", ... "v8" of the color difference signal U/V inherently represent the color difference value V.

FIG. 7 (*a*) shows the recognition order of the color difference signal U/V previously set in the color difference processor 21 below the color difference signal U/V.

This recognition order causes the color difference processor 21 to recognize an odd-numbered value and an even-numbered value of the color difference signal U/V with the rise of the horizontal synchronizing signal H used as a basis, respectively, as the color difference value U and the color difference value V when the video format is other than 525I (60 Hz) and 625I (50 Hz).

Thus, the values "val", "u0", ... "u8" of the color difference signal U/V that are arranged in odd numbers from the rise of the horizontal synchronizing signal are recognized as the color difference value U in the example of FIG. 7 (*a*). Furthermore, the values "val", "v0", "v8" of the color difference signal U/V that are arranged in even numbers from the rise of the horizontal synchronizing signal H are recognized as the color difference value V.

The operation for recognizing the color difference signal U/V in a case where the video format is other than 525I (60 Hz) and 625I (50 Hz) will be described on the basis of FIG. 7 (*b*).

FIG. 7 (*b*) also shows an example of the horizontal synchronizing signal H, the data enable signal DE, and the color difference signal U/V, similarly to FIG. 7 (*a*). Here, in the example of FIG. 7 (*b*), the data enable signal DE and the color difference signal U/V do not conform to the standard of the video format.

Specifically, the rise of the data enable signal DE shown in FIG. 7 (*b*) is one clock later than the rise of the data enable signal DE shown in FIG. 7 (*a*) conforming to the standard of the video format. This involves making the value "val" of the color difference signal U/V one clock later while also making the values "u0", "v0", ... "u8", "v8" one clock later.

Thus, the first blanking period HDE becomes one clock longer than the first standard blanking period HDE0. Thus, the number of clocks in the first blanking period HDE, that is, the first blanking pixel number hde is odd. In FIG. 7 (*b*), a symbol HDE1 is assigned to the first blanking period HDE at this time.

Here, the color difference processor 21 performs the operation for recognizing the color difference signal U/V in accordance with the recognition order previously set when the video format is other than 525I (60 Hz) and 625I (50 Hz) irrespective of the inputted data enable signal DE and color difference signal U/V, as in the example of FIG. 7 (*a*).

As a result, in the example of FIG. 7 (*b*), the values "val", "v0", ... "v8" of the color difference signal U/V that are arranged in odd numbers from the rise of the horizontal synchronizing signal H are erroneously recognized as the color difference value U. Furthermore, the values "val", "u0", ... "u8" of the color difference signal U/V that are arranged in even numbers from the rise of the horizontal synchronizing signal H are erroneously recognized as the color difference value V.

Thus, the reversing processor 22 shown in FIG. 1 performs, when the video format of the digital video signal is other than 525I (60 Hz) and 625I (50 Hz) and the value of the first blanking period HDE is odd, reversing processing, to reverse the recognition of the color difference signal U/V by the color difference processor 21.

That is, the reversing processor 22 recognizes the values "val", "v0", ... "v8" of the color difference signal U/V erroneously recognized as the color difference value U again as the color difference value V, while recognizing the values "val", "u0", ... "u8" of the color difference signal U/V erroneously recognized as the color difference value V again as the color difference value U.

(9-b) Case where Video Format is 525I (60 Hz)

When the video format is 525I (60 Hz) and 625I (50 Hz), as described above, one clock of the sampling clock signal for the digital video signal corresponds to two clocks in the HDMI receiver 10. This causes the color difference value U and the color difference value V to be transmitted every two clocks to the digital video processing circuit 20.

Thus, the operation for recognizing the color difference signal U/V for each clock by the color difference processor 21 differs from that in the case where the video format being other than 525I (60 Hz) and 625I (50 Hz).

(9-b-1) Operation for Recognizing Color Difference Signal

An operation for recognizing the color difference signal U/V in a case where the video format is 525I (60 Hz) will be described on the basis of FIG. 8 (*a*).

FIG. 8 (*a*) shows an example of the horizontal synchronizing signal H, the data enable signal DE, and the color difference signal U/V that are transmitted to the digital video processing circuit 20. The signals conform to the video format 525I (60 Hz).

As shown in FIG. 8 (*a*), the horizontal synchronizing signal H and the data enable signal DE are inputted to the digital video processing circuit 20. When the horizontal synchronizing signal H and the data enable signal DE conform to the standard of the video format 525I (60 Hz), the first blanking period HDE is composed of 238 clocks.

In this example, the first blanking period HDE conforming to the standard is also referred to as a first standard blanking period HDE0.

Furthermore, the color difference signal U/V is inputted to the digital video processing circuit 20. Here, the color difference signal U/V includes values "u0", "u0", "v0", "v0", ... "v4", "v4", "u6", "u6" in this order for each clock.

That is, in this example, one value of the color difference signal U/V is inputted to the digital video processing circuit 20 continuously over two clocks.

Note that the values "u0", ... "u6" of the color difference signal U/V inherently represent the color difference value U, and the values "v0", . . . "v4" of the color difference signal U/V inherently represent the color difference value V.

FIG. 8 (a) shows the recognition order of the color difference signal U/V previously set in the color difference processor 21 below the color difference signal U/V.

This recognition order causes the color difference processor 21 to recognize the (4n−3)-th and (4n−2)-th values (n is a natural number) of the color difference signal U/V with the rise of the horizontal synchronizing signal H used as a basis as the color difference value V when the video format is 525I (60 Hz).

Furthermore, the color difference processor 21 recognizes the (4n−1)-th and 4n-th values (n is a natural number) of the color difference signal U/V as the color difference value U.

This recognizing operation is performed for the values of the color difference signal U/V inputted as the data enable signal DE rises. Thereafter, the color difference processor 21 recognizes the color difference signal U/V every two clocks.

Specifically, the color difference processor 21 recognizes, when it recognizes the value of the color difference signal U/V inputted as the data enable signal DE rises as the color difference value U on the basis of the recognition order previously determined, the value of the color difference signal U/V one clock later as the color difference value U irrespective of the recognition order previously determined.

The color difference processor 21 recognizes, when it recognizes the value of the color difference signal U/V further one clock later as the color difference value V on the basis of the recognition order previously determined, the value of the color difference signal U/V one clock later as the color difference value V irrespective of the recognition order previously determined.

Here, 238 that is the number of clocks in the first standard blanking period HDE0, that is, the first standard blanking pixel number hde0 leaves a remainder of two when divided by four.

Therefore, the value "u0" of the color difference signal U/V inputted as the data enable signal DE rises is accurately recognized as the color difference value U. This causes the value "u0" of the color difference signal U/V one clock later to be also accurately recognized as the color difference value U.

The value "v0" of the color difference signal U/V further one clock later is accurately recognized as the color difference value V. This causes the value "v0" of the color difference signal U/V one clock later to be also accurately recognized as the color difference value V.

Thus, in the color difference processor 21, the recognition order of the color difference values U and the color difference values V is previously set in consideration of the sampling clock signal for the digital video signal and the value (238) of the first standard blanking pixel number hde0 previously determined by the standard.

As a result, the color difference processor 21 can accurately recognize the color difference value U and the color difference value V when the color difference signal U/V conforming to the video format 525I (60 Hz) is inputted. In this case, the reversing processor 22 shown in FIG. 1 does not perform reversing processing.

When the first blanking pixel number hde leaves a remainder of two when divided by four even with the first blanking pixel number hde not conforming to the video format 525I (60 Hz), the color difference processor 21 accurately recognizes the color difference values U and V in the same way as described above. Therefore, also in this case, the reversing processor 22 shown in FIG. 1 does not perform reversing processing.

(9-b-2) Operation for Recognizing Color Difference Signal not Conforming to Video Format (1)

An example of the operation for recognizing the color difference signal U/V not conforming to the video format 525I (60 Hz) will be described on the basis of FIG. 8 (b).

FIG. 8 (b) also shows an example of the horizontal synchronizing signal H, the data enable signal DE, and the color difference signal U/V, similarly to FIG. 8 (a). Here, in the example of FIG. 8 (b), the data enable signal DE and the color difference signal U/V do not conform to the standard of the video format.

Specifically, the rise of the data enable signal DE shown in FIG. 8 (b) is one clock later than the rise of the data enable signal DE shown in FIG. 8 (a) conforming to the standard of the video format. That is, the first blanking pixel number hde in this example leaves a remainder of three when divided by four. In FIG. 8 (b), a symbol HDE1 is assigned to the first blanking period HDE at this time.

This involves making the value "val" of the color difference signal U/V one clock later while also making the values "u0", "u0", "v0", "v0", . . . "u4", "u4", "v6", "v6" one clock later.

Here, the color difference processor 21 recognizes the color difference signal U/V every two clocks on the basis of the recognition order previously set irrespective of the inputted data enable signal DE and color difference signal U/V, as in the example of FIG. 8 (a).

As a result, the value "u0" of the color difference signal U/V inputted as the data enable signal DE rises is accurately recognized as the color difference value U, as in the example of FIG. 8 (b). This causes the value "u0" of the color difference signal U/V one clock later to be also accurately recognized as the color difference value U.

The value "v0" of the color difference signal U/V further one clock later is accurately recognized as the color difference value V. This causes the value "v0" of the color difference signal U/V one clock later to be also accurately recognized as the color difference value V.

When the first blanking pixel number hde leaves a remainder of three when divided by four even with the first blanking pixel number hde not conforming to the video format 525I (60 Hz), the reversing processor 22 shown in FIG. 1 does not perform reversing processing.

(9-b-3) Operation for Recognizing Color Difference Signal not Conforming to Video Format (2)

Another example of the operation for recognizing the color difference signal U/V not conforming to the video format 525I (60 Hz) will be described on the basis of FIG. 8 (c).

FIG. 8 (c) also shows an example of the horizontal synchronizing signal H, the data enable signal DE, and the color difference signal U/V, similarly to FIG. 8 (a). Here, in the example of FIG. 8 (c), the data enable signal DE and the color difference signal U/V do not conform to the standard of the video format.

Specifically, the rise of the data enable signal DE shown in FIG. 8 (c) is two clocks later than the rise of the data enable signal DE shown in FIG. 8 (a) conforming to the standard of the video format. That is, the first blanking pixel number hde in this example leaves a remainder of zero when divided by four. In FIG. 8 (c), a symbol HDE2 is assigned to the first blanking period HDE at this time.

This involves making the value "val" of the color difference signal U/V two clocks later while also making the values "u0", "u0", "v0", "v0", . . . "u4", "u4", "v6, "v6" two clocks later.

Here, the color difference processor 21 recognizes the color difference signal U/V every two clocks on the basis of the recognition order previously set irrespective of the inputted data enable signal DE and color difference signal U/V, as in the example of FIG. 8 (a).

As a result, the value "u0" of the color difference signal U/V inputted as the data enable signal DE rises is erroneously recognized as the color difference value V, as in the example of FIG. 8 (c). This causes the value "u0" of the color difference signal U/V one clock later to be also erroneously recognized as the color difference value V.

The value "v0" of the color difference signal U/V further one clock later is erroneously recognized as the color difference value U. This causes the value "v0" of the color difference signal U/V one clock later to be also erroneously recognized as the color difference value U.

The first reversing processor 22 shown in FIG. 1 performs, when the first blanking pixel number hde does not conform to the video format 525I (60 Hz) and leaves a remainder of zero when divided by four, reversing processing, to reverse the recognition of the color difference signal U/V by the color difference processor 21. This causes the color difference value U and the color difference value V to be accurately recognized.

(9-b-4) Operation for Recognizing Color Difference Signal not Conforming to Video Format (3)

Still another example of the operation for recognizing the color difference signal U/V not conforming to the video format 525I (60 Hz) will be described on the basis of FIG. 8 (d).

FIG. 8 (d) also shows an example of the horizontal synchronizing signal H, the data enable signal DE, and the color difference signal U/V, similarly to FIG. 8 (a). Here, in the example of FIG. 8 (d), the data enable signal DE and the color difference signal U/V do not conform to the standard of the video format.

Specifically, the rise of the data enable signal DE shown in FIG. 8 (d) is three clocks later than the rise of the data enable signal DE shown in FIG. 8 (a) conforming to the standard of the video format. That is, the first blanking pixel number hde in this example leaves a remainder of one when divided by four. In FIG. 8 (d), a symbol HDE3 is assigned to the first blanking period HDE at this time.

This involves making the value "val" of the color difference signal U/V three clocks later while also making the values "u0", "u0", "v0", "v0", ... "u4", "u4", "v6, "v6" three clocks later.

Here, the color difference processor 21 recognizes the color difference signal U/V every two clocks on the basis of the recognition order previously set irrespective of the inputted data enable signal DE and color difference signal U/V, as in the example of FIG. 8 (a).

As a result, the value "u0" of the color difference signal U/V inputted as the data enable signal DE rises is erroneously recognized as the color difference value V, as in the example of FIG. 8 (d). This causes the value "u0" of the color difference signal U/V one clock later to be also erroneously recognized as the color difference value V.

The value "v0" of the color difference signal U/V further one clock later is erroneously recognized as the color difference value U. This causes the value "v0" of the color difference signal U/V one clock later to be also erroneously recognized as the color difference value U.

The first reversing processor 22 shown in FIG. 1 performs, when the first blanking pixel number hde does not conform to the video format 525I (60 Hz) and leaves a remainder of one when divided by four, reversing processing, to reverse the recognition of the color difference signal U/V by the color difference processor 21. This causes the color difference value U and the color difference value V to be accurately recognized.

(9-c) Case where Video Format is 625I (50 Hz)
(9-c-1) Operation for Recognizing Color Difference Signal An operation for recognizing the color difference signal U/V in a case where the video format is 625I (50 Hz) will be described on the basis of FIG. 9 (a).

FIG. 9 (a) shows an example of the horizontal synchronizing signal H, the data enable signal DE, and the color difference signal U/V that are transmitted to the digital video processing circuit 20. The signals conform to the video format 625I (50 Hz).

As shown in FIG. 9 (a), the horizontal synchronizing signal H and the data enable signal DE are inputted to the digital video processing circuit 20. When the horizontal synchronizing signal H and the data enable signal DE conform to the standard of the video format 625I (50 Hz), the first blanking period HDE is composed of 264 clocks.

In this example, the first blanking period HDE conforming to the standard is also referred to as a first standard blanking period HDE0.

Furthermore, the color difference signal U/V is inputted to the digital video processing circuit 20. Here, the color difference signal U/V includes values "u0", "u0", "v0", "v0", ... "v4", "v4", "u6", "u6" in this order for each clock.

That is, in this example, one value of the color difference signal U/V is inputted to the digital video processing circuit 20 continuously over two clocks.

Note that the values "u0", ... "u6" of the color difference signal U/V inherently represent the color difference value U, and the values "v0", ... "v6" of the color difference signal U/V inherently represent the color difference value V.

FIG. 9 (a) shows the recognition order of the color difference signal U/V previously set in the color difference processor 21 below the color difference signal U/V.

This recognition order causes the color difference processor 21 to recognize the (4n–3)-th and (4n–2)-th values (n is a natural number) of the color difference signal U/V with the rise of the horizontal synchronizing signal H used as a basis as the color difference value U when the video format is 625I (50 Hz).

Furthermore, the color difference processor 21 recognizes the (4n–1)-th and 4n-th values (n is a natural number) of the color difference signal U/V as the color difference value V.

This recognizing operation is performed for the values of the color difference signal U/V inputted as the data enable signal DE rises. Thereafter, the color difference processor 21 recognizes the color difference signal U/V every two clocks. The operation for recognizing the color difference signal U/V for two clocks is the same as the operation for recognizing the color difference signal U/V in the case where the video format is 525I (60 Hz).

Here, 264 that is the number of clocks in the first standard blanking period HDE0, that is, the first standard blanking pixel number hde0 leaves a remainder of zero when divided by four.

Therefore, the value "u0" of the color difference signal U/V inputted as the data enable signal DE rises is accurately recognized as the color difference value U. This causes the value "u0" of the color difference signal U/V one clock later to be also accurately recognized as the color difference value U.

The value "v0" of the color difference signal U/V further one clock later is accurately recognized as the color difference value V. This causes the value "v0" of the color difference signal U/V one clock later to be also accurately recognized as the color difference value V.

Thus, in the color difference processor 21, the values "u0", . . . "u6" of the color difference signal U/V that should be inherently recognized as the color difference value U are recognized as the color difference value U, and the values "v0", . . . "v4" of the color difference signal U/V that should be inherently recognized as the color difference value V are recognized as the color difference value V.

As a result, the color difference processor 21 can accurately recognize the color difference value U and the color differences value V when the color difference signal U/V conforming to the video format 625I (50 Hz) is inputted. In this case, the reversing processor 22 shown in FIG. 1 does not perform reversing processing.

When the first blanking pixel number hde leaves a remainder of zero when divided by four even with the first blanking pixel number hde not conforming to the video format 625I (50 Hz), the color difference processor 21 accurately recognizes the color difference values U and V in the same way as described above. Therefore, also in this case, the reversing processor 22 shown in FIG. 1 does not perform reversing processing.

(9-c-2) Operation for Recognizing Color Difference Signal not Conforming to Video Format (1)

An example of the operation for recognizing the color difference signal U/V not conforming to the video format 625I (50 Hz) will be described on the basis of FIG. 9 (*b*).

FIG. 9 (*b*) also shows an example of the horizontal synchronizing signal H, the data enable signal DE, and the color difference signal U/V, similarly to FIG. 9 (*a*). Here, in the example of FIG. 9 (*b*), the data enable signal DE and the color difference signal U/V do not conform to the standard of the video format.

Specifically, the rise of the data enable signal DE shown in FIG. 9 (*b*) is one clock later than the rise of the data enable signal DE shown in FIG. 9 (*a*) conforming to the standard of the video format. That is, the first blanking pixel number hde in this example leaves a remainder of one when divided by four. In FIG. 9 (*b*), a symbol HDE1 is assigned to the first blanking period HD at this time.

This involves making the value "val" of the color difference signal U/V one clock later while also making the values "u0", "u0", "v0", "v0", . . . "u4", "u4", "v6, "v6" one clock later.

Here, the color difference processor 21 recognizes the color difference signal U/V every two clocks on the basis of the recognition order previously set irrespective of the inputted data enable signal DE and color difference signal U/V, as in the example of FIG. 9 (*a*).

As a result, the value "u0" of the color difference signal U/V inputted as the data enable signal DE rises is accurately recognized as the color difference value U, as in the example of FIG. 9 (*b*). This causes the value "u0" of the color difference signal U/V one clock later to be also accurately recognized as the color difference value U.

The value "v0" of the color difference signal U/V further one clock later is accurately recognized as the color difference value V. This causes the value "v0" of the color difference signal U/V one clock later to be also accurately recognized as the color difference value V.

When the first blanking pixel number hde leaves a remainder of one when divided by four even with the first blanking pixel number hde not conforming to the video format 625I (50 Hz), the reversing processor 22 shown in FIG. 1 does not perform reversing processing.

(9-c-3) Operation for Recognizing Color Difference Signal not Conforming to Video Format (2)

Another example of the operation for recognizing the color difference signal U/V not conforming to the video format 625I (50 Hz) will be described on the basis of FIG. 9 (*c*).

FIG. 9 (*c*) also shows an example of the horizontal synchronizing signal H, the data enable signal DE, and the color difference signal U/V, similarly to FIG. 9 (*a*). Here, in the example of FIG. 9 (*c*), the data enable signal DE and the color difference signal U/V do not conform to the standard of the video format.

Specifically, the rise of the data enable signal DE shown in FIG. 9 (*c*) is two clocks later than the rise of the data enable signal DE shown in FIG. 9 (*a*) conforming to the standard of the video format. That is, the first blanking pixel number hde in this example leaves a remainder of two when divided by four. In FIG. 9 (*c*), a symbol HDE2 is assigned to the first blanking period HDE at this time.

This involves making the value "val" of the color difference signal U/V two clocks later while also making the values "u0", "u0", "v0", "v0", . . . "u4", "u4", "v6, "v6" two clocks later.

Here, the color difference processor 21 recognizes the color difference signal U/V every two clocks on the basis of the recognition order previously set irrespective of the inputted data enable signal DE and color difference signal U/V, as in the example of FIG. 9 (*a*).

As a result, the value "u0" of the color difference signal U/V inputted as the data enable signal DE rises is erroneously recognized as the color difference value V, as in the example of FIG. 9 (*c*). This causes the value "u0" of the color difference signal U/V one clock later to be also erroneously recognized as the color difference value V.

The value "v0" of the color difference signal U/V further one clock later is erroneously recognized as the color difference value U. This causes the value "v0" of the color difference signal U/V one clock later to be also erroneously recognized as the color difference value U.

The first reversing processor 22 shown in FIG. 1 performs, when the first blanking pixel number hde does not conform to the video format 625I (50 Hz) and leaves a remainder of two when divided by four, reversing processing, to reverse the recognition of the color difference signal U/V by the color difference processor 21. This causes the color difference value U and the color difference value V to be accurately recognized.

(9-c-4) Operation for Recognizing Color Difference Signal not Conforming to Video Format (3)

Still another example of the operation for recognizing the color difference signal U/V not conforming to the video format 625I (50 Hz) will be described on the basis of FIG. 9 (*d*).

FIG. 9 (*d*) also shows an example of the horizontal synchronizing signal H, the data enable signal DE, and the color difference signal U/V, similarly to FIG. 9 (*a*). Here, in the example of FIG. 9 (*d*), the data enable signal DE and the color difference signal U/V do not conform to the standard of the video format.

Specifically, the rise of the data enable signal DE shown in FIG. 9 (*d*) is three clocks later than the rise of the data enable signal DE shown in FIG. 9 (*a*) conforming to the standard of the video format. That is, the first blanking pixel number hde in this example leaves a remainder of three when divided by four. In FIG. 8 (*d*), a symbol HDE3 is assigned to the first blanking period HDE at this time.

This involves making the value "val" of the color difference signal U/V three clocks later while also making the values "u0", "u0", "v0", "v0", . . . "u4", "u4", "v6", "v6" three clocks later.

Here, the color difference processor 21 recognizes the color difference signal U/V every two clocks on the basis of the recognition order previously set irrespective of the inputted data enable signal DE and color difference signal U/V, as in the example of FIG. 9 (a).

As a result, the value "u0" of the color difference signal U/V inputted as the data enable signal DE rises is erroneously recognized as the color difference value V, as in the example of FIG. 9 (d). This causes the value "u0" of the color difference signal U/V one clock later to be also erroneously recognized as the color difference value V.

The value "v0" of the color difference signal U/V further one clock later is erroneously recognized as the color difference value U. This causes the value "v0" of the color difference signal U/V one clock later to be also erroneously recognized as the color difference value U.

The first reversing processor 22 shown in FIG. 1 performs, when the first blanking pixel number hde does not conform to the video format 625I (50 Hz) and leaves a remainder of three when divided by four, reversing processing, to reverse the recognition of the color difference signal U/V by the color difference processor 21. This causes the color difference value U and the color difference value V to be accurately recognized.

(10) Specific Example of Reversing Processing by Reversing Processor

Figure 11:
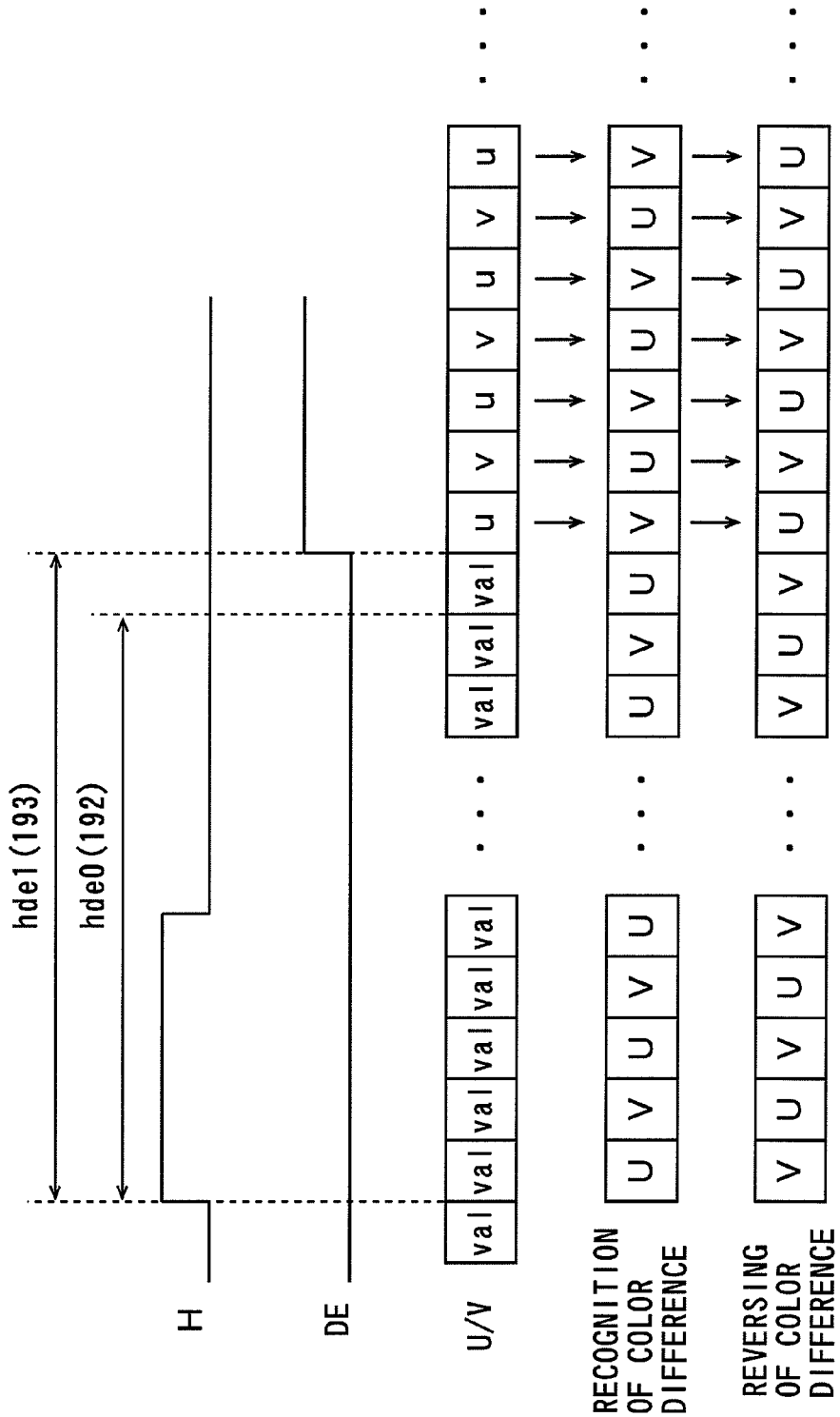
FIG. 11 is a diagram for explaining a specific example of reversing processing by the reversing processor shown in FIG. 1.
Figure 12:
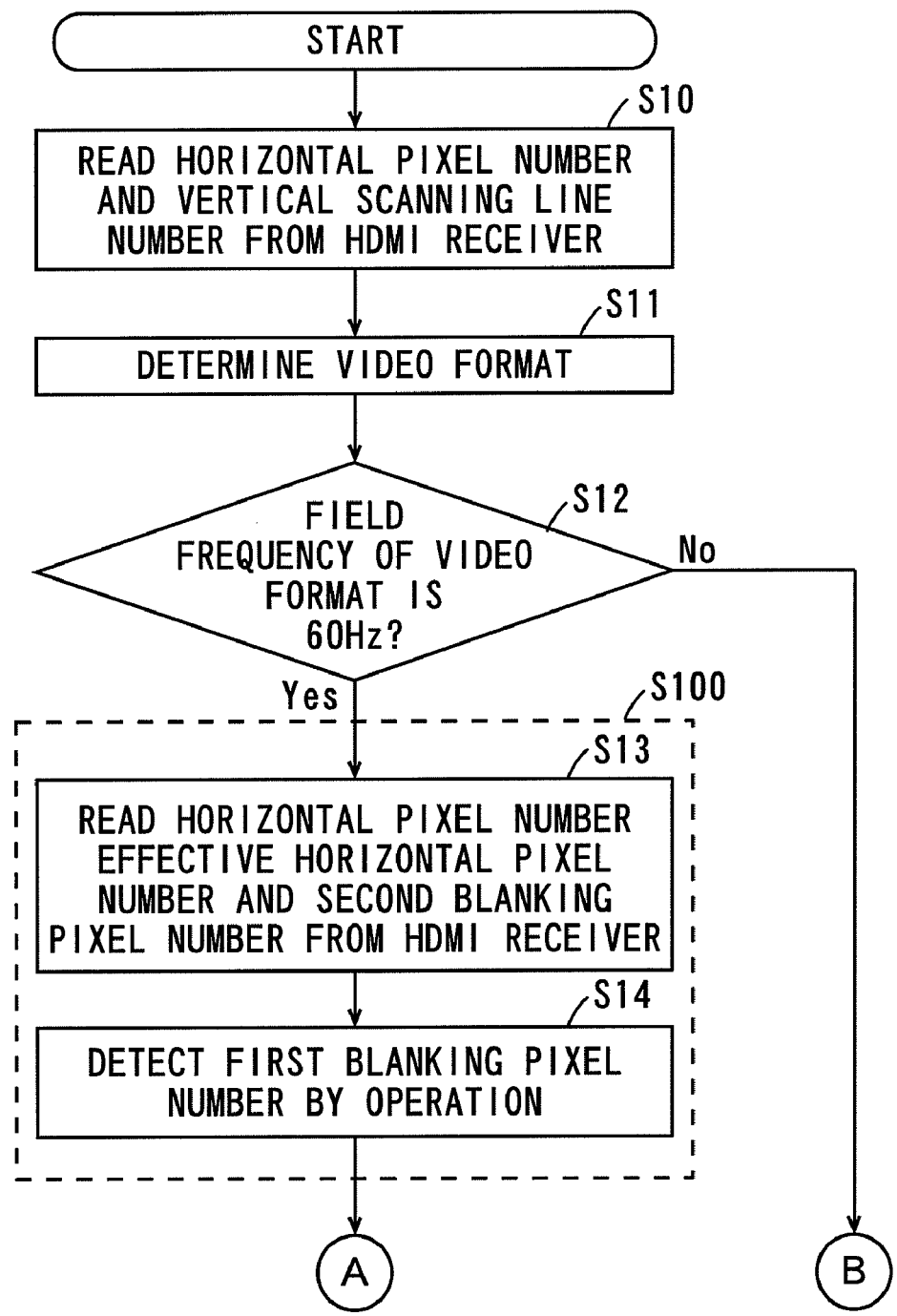
FIG. 12 is a flow chart of a digital signal receiving program according to an embodiment of the present invention.
Figure 13:
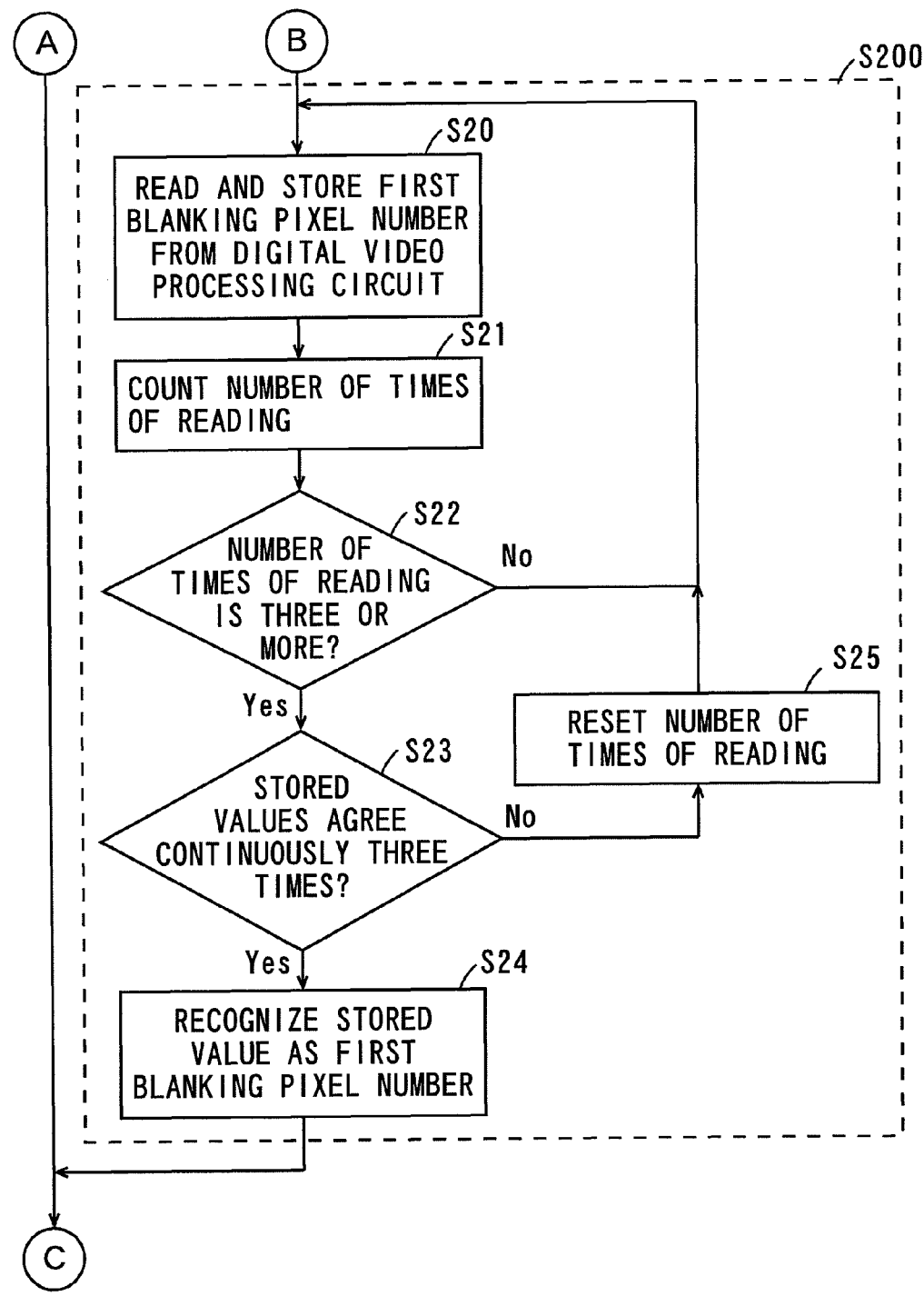
FIG. 13 is a flow chart of a digital signal receiving program according to the embodiment of the present invention.
Figure 14:
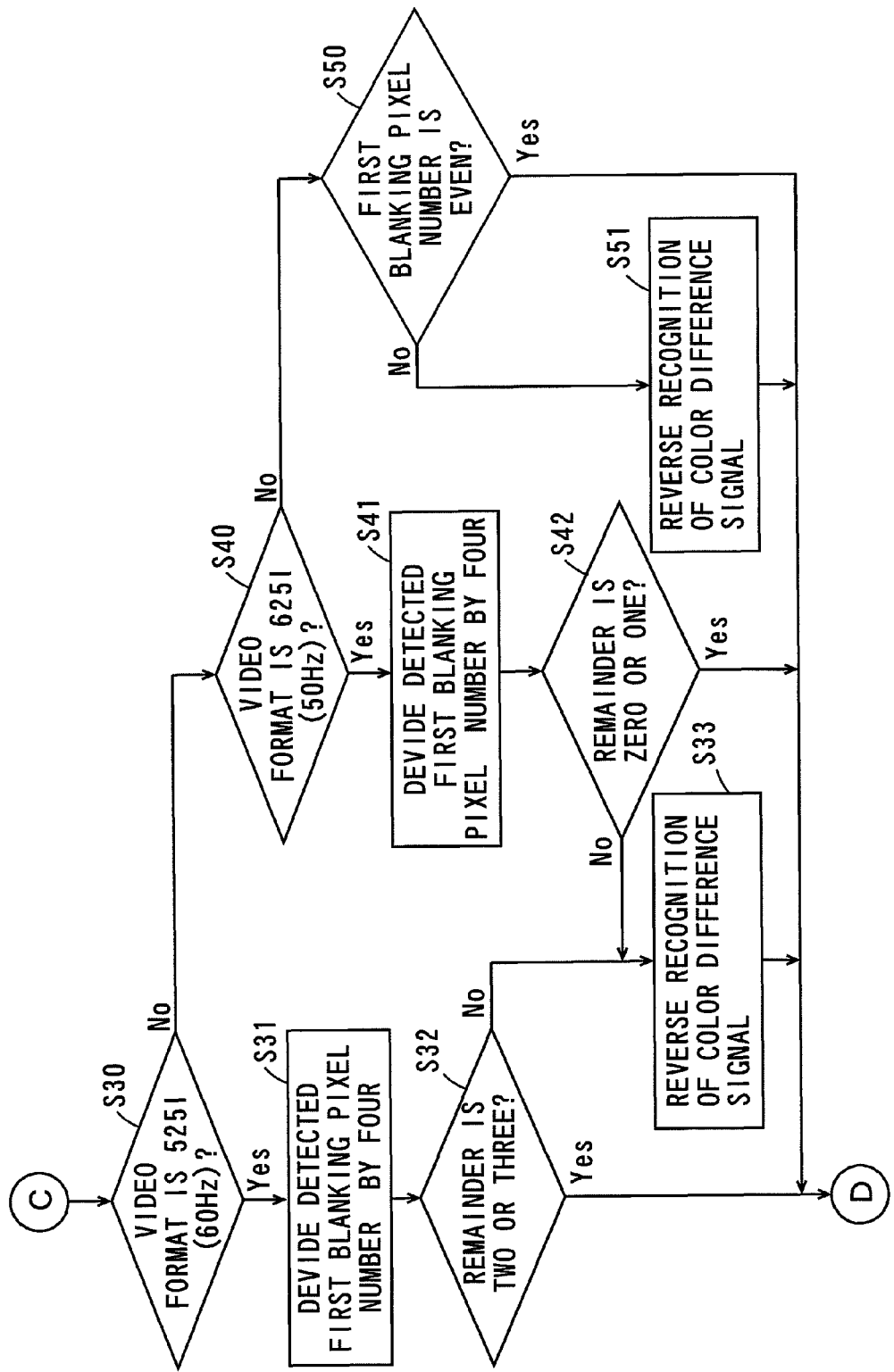
FIG. 14 is a flow chart of a digital signal receiving program according to the embodiment of the present invention.
Figure 16:
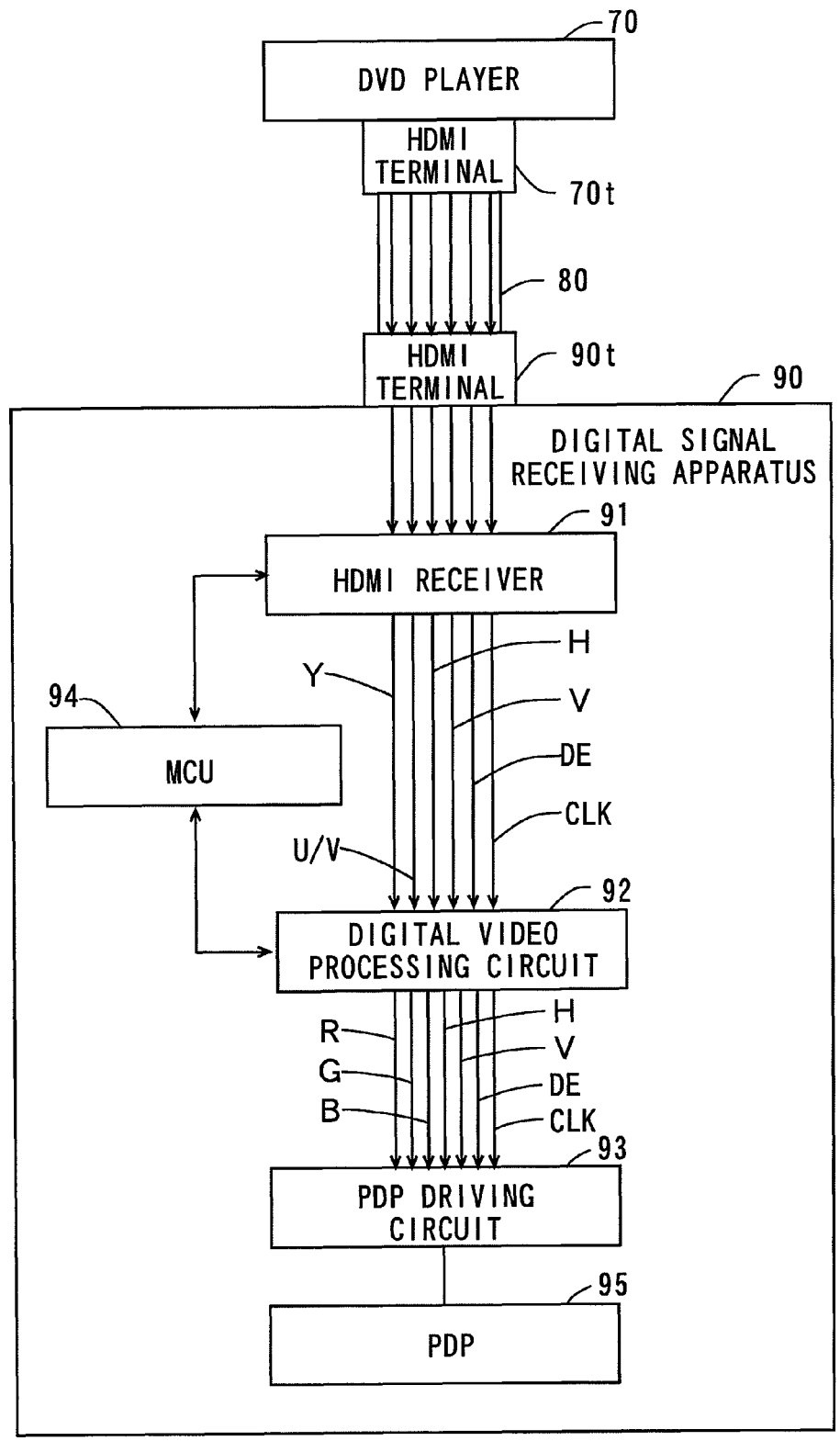
FIG. 16 is a block diagram for explaining a digital signal receiving apparatus conforming to the HDMI standard.
Figure 17:
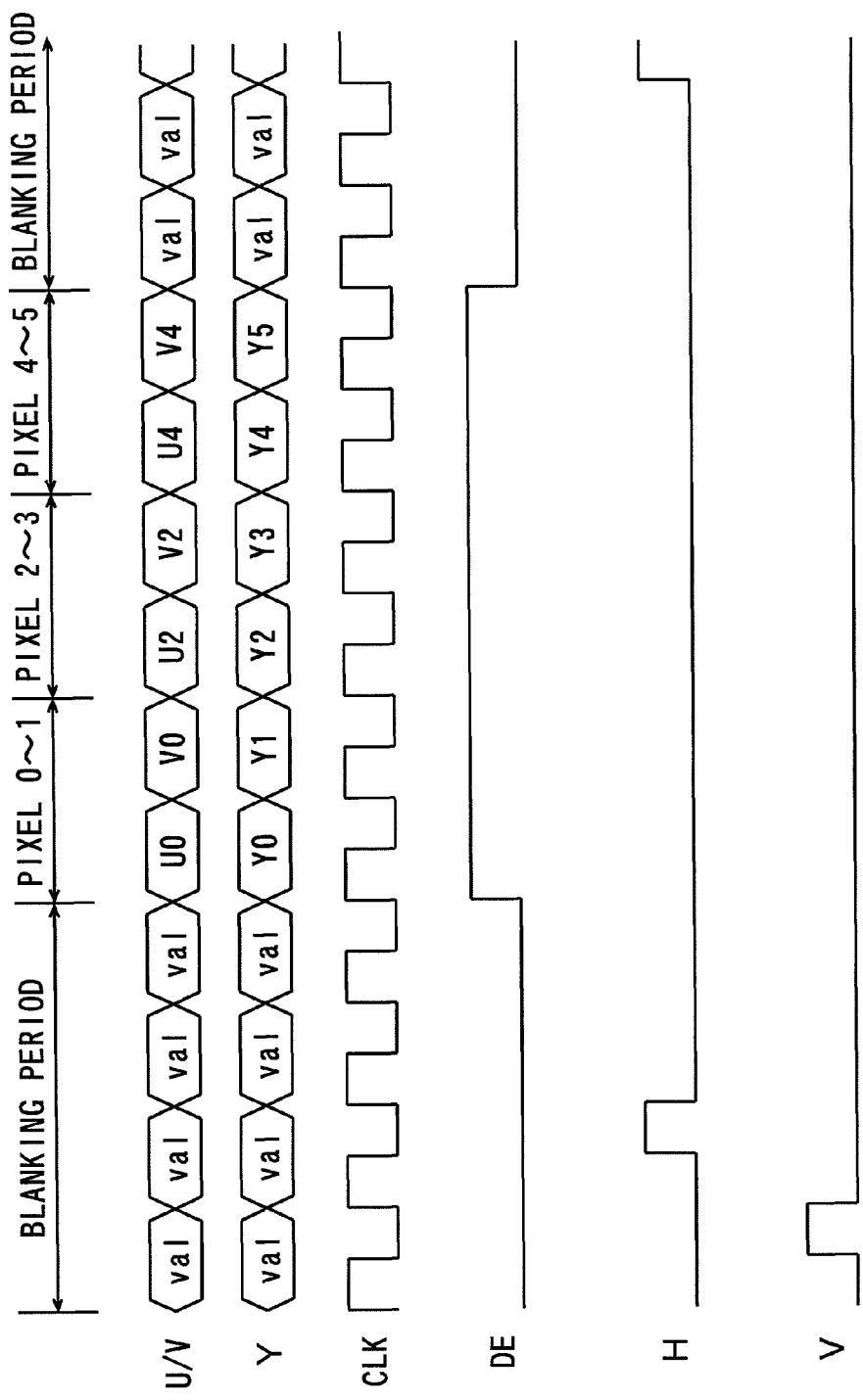
FIG. 17 is a timing chart showing an example of signals transmitted from an HDMI receiver to a video signal processing circuit as shown in FIG. 16.
Figure 18:
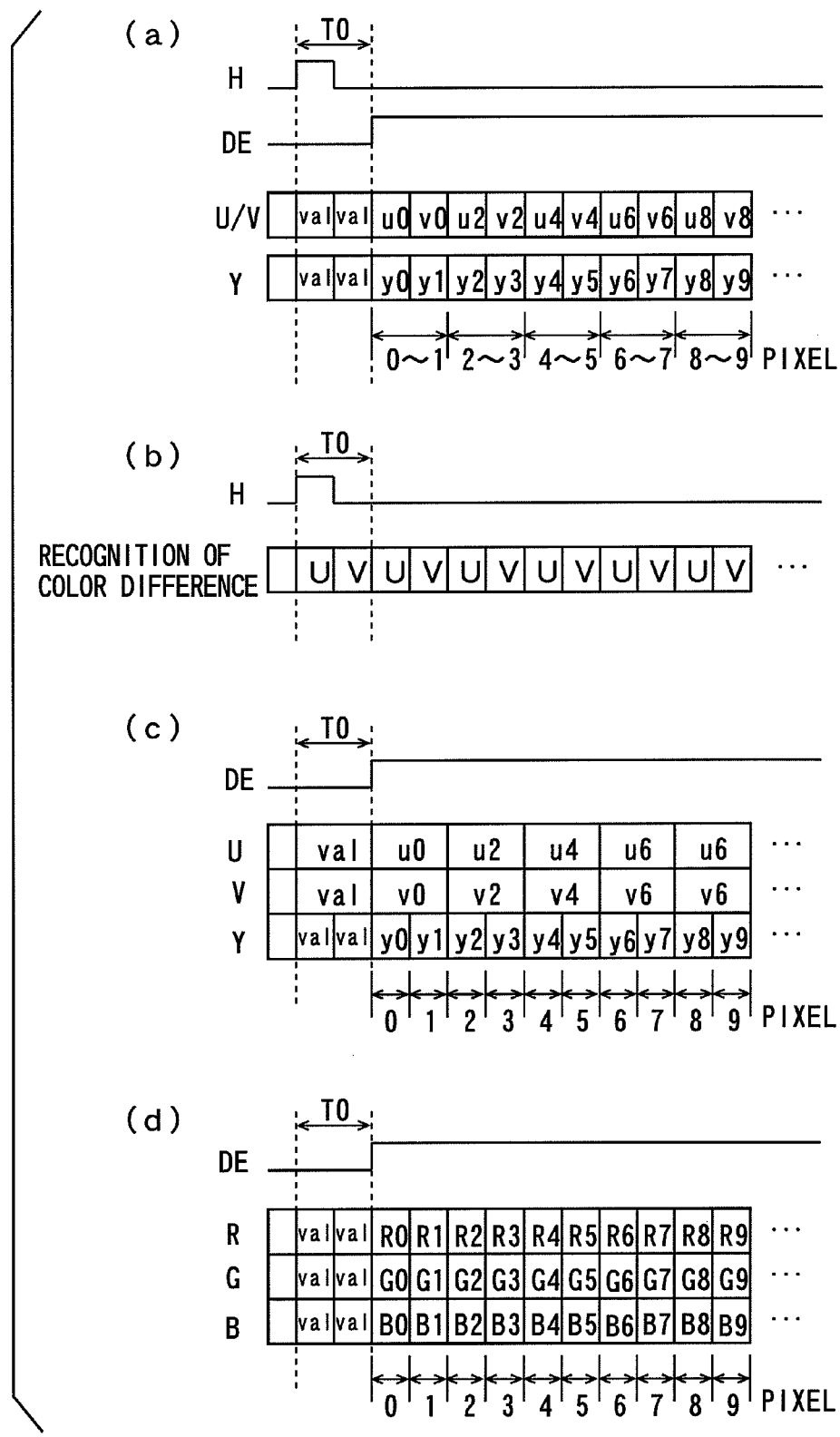
FIG. 18 is a timing chart for explaining processing of a digital video processing circuit shown in FIG. 16.
Figure 19:
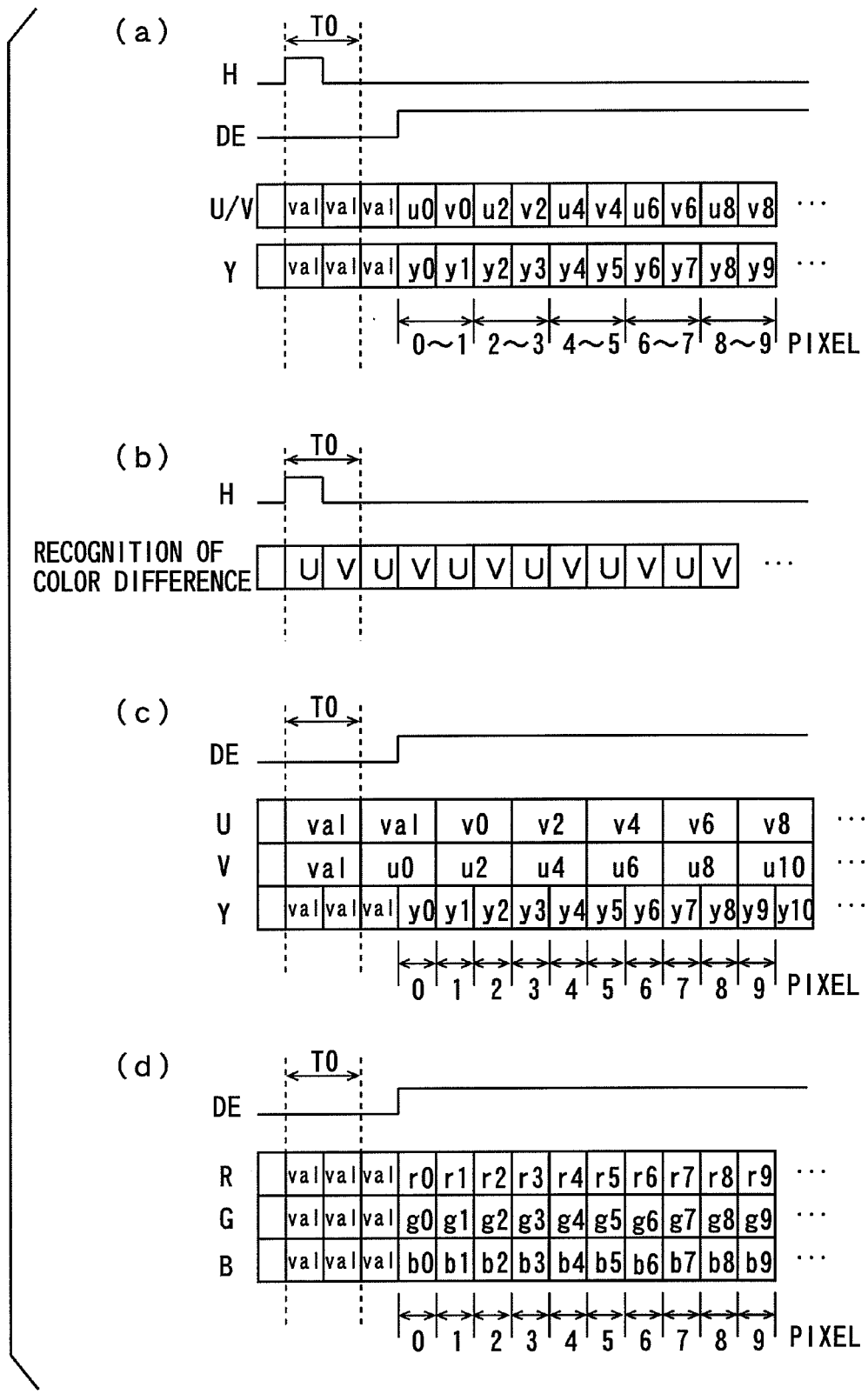
FIG. 19 is a timing chart for explaining processing of the digital video processing circuit in a case where an invalid signal is fed.

FIGS. 10 and 11 are diagrams for explaining a specific example of the reversing processing by the reversing processor 22 shown in FIG. 1.

FIG. 10 shows the respective values of the horizontal pixel number hr, the effective horizontal pixel number dep, the second blanking pixel number bb, and the first blanking pixel number hde that conform to the standard of the video format 1080I (60 Hz) and respective values according to a specific example not conforming to the standard.

In the standard of the video format 1080I (60 Hz), the horizontal pixel number hr is determined to be 2200, the effective horizontal pixel number dep is determined to be 1920, the second blanking pixel number bb is determined to be 88, and the first blanking pixel number hde0 is determined to be 192.

On the other hand, in this specific example, the horizontal pixel number hr is 2200, the effective horizontal pixel number dep is 1920, the second blanking pixel number bb is 87, and the first blanking pixel number is 193.

Thus, the values of the second blanking pixel number bb and the first blanking pixel number hde1 in this specific example are respectively shifted by one from the values determined by the standard.

FIG. 11 is a timing chart of the horizontal synchronizing signal H, the data enable signal DE, and the color difference signal U/V in the specific example. In FIG. 11, the value "u" of the color difference signal U/V inherently represents the color difference value U, and the value "v" of the color difference signal U/V inherently represents the color difference value V.

As described in the foregoing, the value of the first blanking pixel number hde1 in this example is one larger than the first standard blanking pixel number hde0. Thus, in the timing chart of FIG. 11, the rise of the data enable signal DE is one clock later than the rise conforming to the standard.

FIG. 11 shows the recognition order of the color difference signal U/V previously set in the color difference processor 21 below the color difference signal U/V. When the video format is other than 525I (60 Hz) and 625I (50 Hz), the color difference processor 21 recognizes an odd-numbered value and an even-numbered value of the color difference signal U/V with the rise of the horizontal synchronizing signal H used as a basis, respectively, as the color difference value U and the color difference value V, as described above.

Thus, the values "val" and "v" of the color difference signal U/V that are arranged in odd numbers from the rise of the horizontal synchronizing signal H are recognized as the color difference value U in the example of FIG. 11. Furthermore, the values "val" and "u" of the color difference signal U/V that are arranged in even numbers from the rise of the horizontal synchronizing signal H are recognized as the color difference value V.

Thereafter, the reversing processor 22 reverses the determination of the color difference value U and the color difference value V that have been recognized once by the color difference processor 21. FIG. 11 shows how the recognition of the color difference signal U/V is reversed below its part showing the recognition order of the color difference signal U/V.

The reversing processor 22 thus reversing the recognition of the color difference signal U/V causes the values "u" of the color difference signal U/V to be accurately recognized as the color difference value U. Furthermore, the values "v" of the color difference signal U/V that are arranged in even numbers from the rise of the horizontal synchronizing signal H are accurately recognized as the color difference value V.

(11) Digital Signal Receiving Program

Color difference processing, reversing processing, and primary color conversion processing in the digital video processing circuit 20 are performed by the MCU 40 controlling the digital video processing circuit 20 on the basis of the digital signal receiving program described below.

FIGS. 12 to 15 are flowcharts of a digital signal receiving program according to an embodiment of the present invention.

First, the MCU 40 reads the horizontal pixel number hr and the vertical scanning line number vr that are stored in the register of the HDMI receiver 10 (step S10).

Then, the MCU 40 determines the video format of the digital video signal inputted on the basis of the horizontal pixel number hr, the vertical scanning line number vr, and the video format table stored by itself (step S11).

Therefore, the MCU 40 determines whether or not the field frequency of the determined video format is 60 Hz (step S12).

The MCU 40 performs operation detection of the first blanking pixel number hde when the field frequency of the video format is 60 Hz (step S100). The specific operation in the step S100 is as follows.

The MCU 40 reads the horizontal pixel number hr, the effective horizontal pixel number dep, and the second blanking pixel number bb from the HDMI receiver 10 (step S13). The MCU 40 subtracts the effective horizontal pixel number dep and the second blanking pixel number bb from the horizontal pixel number hr, to calculate the first blanking pixel number hde (step S14). This causes the first blanking pixel number hde to be detected by operation detection. Thereafter, the ECU 40 performs an operation in the step S30, described later.

In the foregoing step S12, the MCU 40 performs counting detection of the first blanking pixel number hde when the field frequency of the video format is not 60 Hz, that is, the field frequency of the video format is 50 Hz (step S200). The specific operation in the step S200 is as follows.

The MCU 40 reads and stores the first blanking pixel number hde stored in the register of the digital video processing circuit 20 (step S20). The MCU 40 counts the number of times of reading of the first blanking pixel number hde (step S21).

The MCU 40 determines whether or not the number of times of reading of the first blanking pixel number hde is three or more (step S22).

The MCU 40 determines, when the number of times of reading is three or more, whether or not the values of the first blanking pixel number hde that have been stored for each reading coincide with each other continuously three times (step S23).

When the values of the first blanking pixel number hde coincide with each other continuously three times, the MCU 40 recognizes the stored value as the first blanking pixel number hde (step S24). This causes the first blanking pixel number hde to be detected by counting detection. Thereafter, the ECU 40 performs an operation in the step S30, described later.

In the forgoing step S22, the MCU 40 repeats the operations in the steps S20 to S22 unless the number of times of reading is three or more.

In the foregoing step S23, the MCU 40 resets the number of times of reading when the stored values do not coincide with each other continuously three times (step S25), to repeat the operations in the steps S20 to S23.

After the first blanking pixel number hde is detected in the step S100 or step S200, the MCU 40 determines whether or not the video format of the received digital video signal is 525I (60 Hz) (step S30).

When the video format is 525I (60 Hz), the MCU 40 divides the value of the detected first blanking pixel number hde by four (step S31), and determines whether or not a remainder is two or three from the results of the division (step S32).

The MCU 40 controls the operation of the digital video processing circuit 20 on the basis of the determined video format if the remainder is two or three (step S60), and transmits the primary color signals R, G, and B, the horizontal synchronizing signal H, the vertical synchronizing signal V, the data enable signal DE, and the sampling clock signal CLK from the digital video processing circuit 20 to the PDP driving circuit 30. This causes the MCU 40 to display the video on the PDP 50 (step S61).

The MCU 40 controls the reversing processor 22 to perform reversing processing when it determines in the step 32 that the remainder is not two or three, that is, the remainder is zero or one from the results of the division in the step S31, to reverse the recognition of the color difference signal U/V by the color difference processor 21 (step S33). Thereafter, the MCU 40 performs the operations in the steps S60 and S61 as in the foregoing.

When the video format is not 525I (60 Hz) in the foregoing step S30, the MCU 40 determines whether or not the video format of the received digital video signal is 625I (50 Hz) (step S40).

When the video format is 625I (50 Hz), the MCU 40 divides the value of the detected first blanking pixel number hde by four (step S41), and determines whether or not a remainder is zero or one from the results of the division (step S42).

The MCU 40 performs the operations in the steps S60 and S61 if the remainder is zero or one. On the other hand, the MCU 40 controls the reversing processor 22 to perform reversing processing unless the remainder is zero or one, that is, if the remainder is two or three from the results of the division in the step S41, to perform the operation in the foregoing step S33. Thereafter, the MCU 40 performs the operations in the steps S60 and S61.

When the video format is not 625I (50 Hz) in the foregoing step S40, the MCU 40 determines whether or not the value of the detected first blanking pixel number hde is even (step S50).

The MCU 40 performs the operations in the steps S60 and S61 when the value of the first blanking pixel number hde is even. On the other hand, the MCU 40 controls the reversing processor 22 to perform reversing processing, to reverse the recognition of the color difference signal U/V by the color difference processor 21 (step S51) when the value of the first blanking pixel number hde is not even. Thereafter, the MCU 40 performs the operations in the steps S60 and S61 as in the foregoing.

(12) Method for Realizing Each Constituent Element

In the present embodiment, some of constituent elements in the digital signal receiving apparatus 100 shown in FIG. 1 may be functionally realized by software, and the others may be realized by hardware such as an electric circuit. Alternatively, all the constituent elements in the digital signal receiving apparatus 100 may be realized by hardware.

(13) Effects

In the digital signal receiving apparatus 100 according to the present embodiment, the HDMI receiver 10 receives the digital video signal. The HDMI receiver 10 decodes the received digital video signal, and transmits to the digital video processing circuit 20 the luminance signal Y, the color difference signal U/V, the horizontal synchronizing signal H, the vertical synchronizing signal V, the data enable signal DE, and the sampling clock signal CLK. The color difference signal U/V has two types of color difference signals U and V alternately multiplexed therein.

The MCU 40 reads the information relating to the video format stored in the register of the HDMI receiver 10, and detects the video format of the digital video signal received on the basis of the information while controlling the digital video processing circuit 20.

The color difference processor 21 in the digital video processing circuit 20 sequentially recognizes the values of the color difference signal U/V as the color difference value U and the color difference value V in a predetermined order corresponding to the video format detected by the MCU 40.

Here, the MCU 40 determines on the basis of the first blanking pixel number hde whether or not the value of the color difference signal U/V transmitted from the HDMI receiver 10 to the digital video processing circuit 20 conforms to a predetermined order corresponding to the video format. The MCU 40 controls the digital video processing circuit 20 on the basis of the results of the determination.

The MCU 40 controls, when it determines that the recognition order by the color difference processor 21 and the order of the color difference values U and V in the color difference signal U/V actually inputted to the digital video processing circuit 20 are not correct, the reversing processor 22, to reverse the recognition of the color difference signal U/V.

Even if the color difference processor 21 erroneously recognizes the color difference values U and V in the color difference signal U/V, respectively, as the color difference value V and the color difference value U when the color difference signal U/V whose value does not conform to the order of the color difference signal U/V having the proper video format is obtained from the received digital video signal, the reversing processor 22 corrects the erroneous results of the recognition.

As a result, even when the received digital video signal does not accurately conform to the standard, the color difference values U and V in the color difference signal U/V can be accurately produced.

Although in the present embodiment, the digital video signal received by the signal receiving device 100 conforms to the HDMI standard, as described above, the digital video signal received by the signal receiving device 100 may conform to the DVI (Digital Visual Interface) standard.

(14) Correspondence Between Constituent Elements in Claims and Parts in Embodiments In the following two paragraphs, non-limiting examples of correspondences between various elements recited in the claims below and those described above with respect to an embodiment of the present invention are explained.

In the digital signal receiving apparatus and the digital signal receiving method according to the embodiment of the present invention, the digital video signal is an example of a digital signal, the HDMI receiver 10 is an example of a signal receiver, the MCU 40 is an example of a video format detector and a recognition determination unit, the digital video processing circuit 20 and the color difference processor 21 are examples of a color difference processor, the digital video processing circuit 20 and the reversing processor 22 are examples of a recognition reversing unit, and the digital video processing circuit 20 and the conversion processor 23 are examples of a primary color signal generator.

Furthermore, the horizontal pixel number hr and the horizontal scanning period HR are examples of a horizontal scanning period, the effective horizontal pixel number dep and the effective video period DEP are examples of an effective video period, the second blanking pixel number bb and the second blanking period BB are examples of a second period, the first blanking pixel number hde and the first blanking period HDE are examples of a first period, the digital video processing circuit 20 is an example of a first period detector, the first blanking pixel number hde is an example of a first pixel number, and the primary color signals R, G, and B are examples of a plurality of primary color signals.

As each of constituent elements recited in the claims, various other elements having configurations or functions described in the claims can be also used.

INDUSTRIAL APPLICABILITY

The present invention is applicable to a digital signal receiving apparatus that receives a digital video signal.

The invention claimed is:

1. A digital signal receiving apparatus that receives a digital signal, comprising:
    a signal receiver that receives said digital signal, to output a horizontal synchronizing signal having horizontal synchronizing pulses, a vertical synchronizing signal, a luminance signal, a multiplex color difference signal having first and second color difference signals multiplexed therein, and an effective video signal representing an effective video period from said digital signal;
    a video format detector that detects the video format of said digital signal received by said signal receiver;
    a color difference processor that sequentially recognizes the value of said multiplex color difference signal outputted from said signal receiver in a predetermined order corresponding to said video format detected by said video format detector as the respective values of the first and second color difference signals in response to the horizontal synchronizing pulses of the horizontal synchronizing signal outputted from said signal receiver;
    a recognition determination unit that determines whether or not the value of said multiplex color difference signal outputted from said signal receiver conforms to said order, to determine whether the result of the recognition by said color difference processor is proper or improper; and
    a recognition reversing unit that reverses the results of the recognition by said color difference processor when said recognition determination unit determines that the result of the recognition by said color difference processor is improper.

2. The digital signal receiving apparatus according to claim 1, wherein
    said signal receiver detects a horizontal scanning period of said digital signal, said effective video period, and a second period from the termination of said effective video period to the leading edge of the subsequent horizontal synchronizing pulse on the basis of said horizontal synchronizing signal and said effective video signal, and
    said recognition determination unit detects a first period from the leading edge of said horizontal synchronizing pulse to the start of said effective video period on the basis of said horizontal scanning period, said effective video period, and said second period that have been detected by said signal receiver, to determine whether or not the value of said multiplex color difference signal outputted from said signal receiver conforms to said order on the basis of said detected first period.

3. The digital signal receiving apparatus according to claim 2, wherein
    said recognition determination unit acquires the number of pixels corresponding to said detected first period as a first pixel number, to determine whether or not the value of said multiplex color difference signal outputted from said signal receiver conforms to said order on the basis of a remainder obtained by dividing said acquired first pixel number by a predetermined value.

4. The digital signal receiving apparatus according to claim 1, further comprising
    a first period detector that detects a first period from the leading edge of said horizontal synchronizing pulse to the start of said effective video period on the basis of said horizontal synchronizing signal and said effective video signal that are outputted from said signal receiver,
    wherein said recognition determination unit determines whether or not the value of said multiplex color difference signal outputted from said signal receiver conforms to said order on the basis of the first period detected by said first period detector.

5. The digital signal receiving apparatus according to claim 4, wherein
    said recognition determination unit acquires the number of pixels corresponding to said detected first period as a first pixel number, to determine whether or not the value of said multiplex color difference signal outputted from said signal receiver conforms to said order on the basis of a remainder obtained by dividing said acquired first pixel number by a predetermined value.

6. The digital signal receiving apparatus according to claim 1, further comprising a primary color signal generator that generates a plurality of primary color signals from said luminance signal and the first and second color difference signals on the basis of the result of the recognition by said color difference processor or the result of the recognition reversed by said recognition reversing unit.

7. The digital signal receiving apparatus according to claim 1, wherein said signal receiver receives said digital signal conforming to the DVI (Digital Visual Interface) standard or the HDMI (High-Definition Multimedia Interface) standard.

8. A digital signal receiving method for receiving a digital signal, comprising the steps of:
receiving said digital signal, to output a horizontal synchronizing signal having a horizontal synchronizing pulse, a vertical synchronizing signal, a luminance signal, a multiplex color difference signal having first and second color difference signals multiplexed therein, and an effective video signal representing an effective video period from said digital signal;
detecting the video format of said received digital signal;
sequentially recognizing the value of said outputted multiplex color difference signal in a predetermined order corresponding to said detected video format as the respective values of the first and second color difference signals in response to the horizontal synchronizing pulse of the outputted horizontal synchronizing signal;
determining whether or not the value of said outputted multiplex color difference signal conforms to said order, to determine whether the result of the recognition in said recognizing step is proper or improper; and
reversing the result of the recognition in said recognizing step when it is determined that the results of the recognition is improper.

* * * * *